United States Patent
Batcheller et al.

(10) Patent No.: US 9,924,629 B2
(45) Date of Patent: Mar. 27, 2018

(54) METHOD AND SYSTEM FOR OPTIMIZING PLANTING OPERATIONS

(71) Applicant: Appareo Systems, LLC, Fargo, ND (US)

(72) Inventors: Barry D. Batcheller, West Fargo, ND (US); Joseph A. Heilman, Fargo, ND (US); David C. Batcheller, Fargo, ND (US); Robert V. Weinmann, Wahpeton, ND (US); Jeffrey L. Johnson, West Fargo, ND (US); Paul D. Johnson, Fargo, ND (US); Paul A. Nystuen, West Fargo, ND (US)

(73) Assignee: Appareo Systems, LLC, Fargo, ND (US)

( * ) Notice: Subject to any disclaimer, the term of this patent is extended or adjusted under 35 U.S.C. 154(b) by 162 days.

(21) Appl. No.: 14/312,475

(22) Filed: Jun. 23, 2014

(65) Prior Publication Data
US 2014/0379228 A1 Dec. 25, 2014

Related U.S. Application Data

(60) Provisional application No. 61/837,980, filed on Jun. 21, 2013, provisional application No. 61/977,556, filed on Apr. 9, 2014.

(51) Int. Cl.
*A01C 21/00* (2006.01)
*A01B 79/02* (2006.01)
(Continued)

(52) U.S. Cl.
CPC ............ *A01C 21/005* (2013.01); *A01B 76/00* (2013.01); *A01B 79/005* (2013.01); *A01B 79/02* (2013.01);
(Continued)

(58) Field of Classification Search
CPC ....... A01B 79/005; A01B 76/00; A01C 7/102; A01C 14/00; A01C 23/007; Y10S 111/90;
(Continued)

(56) References Cited

U.S. PATENT DOCUMENTS 5,033,397 A * 7/1991 Colburn, Jr. ......... A01B 79/005
111/118
5,887,491 A * 3/1999 Monson ............... A01B 79/005
250/253
(Continued)

FOREIGN PATENT DOCUMENTS

GB 802899 10/1958

OTHER PUBLICATIONS

"International Search Report and Written Opinion", dated PCT/US2015/025199.
(Continued)

*Primary Examiner* — Thomas Ingram
(74) *Attorney, Agent, or Firm* — Law Office of Mark Brown, LLC; Mark E. Brown

(57) ABSTRACT

An agricultural planting system and method comprising a soil sampling and analysis means, wherein soil samples are taken and analyzed in real-time during a planting operation (or, optionally, via a separate, prior operation) to determine the conditions and nutrient content of the soil, and a planting system, wherein the planting system is capable of planting seeds in any arbitrary position on an X-Y plane directly beneath the planting system, whereby the data gathered from the analyzed soil samples are used to determine the optimal placement of seeds or plants in a field in order to take advantage of the soil conditions present and to optimize crop yield.

3 Claims, 25 Drawing Sheets

Top View of One Embodiment of a Condition-Based Planting Machine

(51) Int. Cl.
*A01B 76/00* (2006.01)
*A01C 7/10* (2006.01)
*A01C 14/00* (2006.01)
*A01B 79/00* (2006.01)

(52) U.S. Cl.
CPC .............. *A01C 7/102* (2013.01); *A01C 14/00* (2013.01); *A01C 21/007* (2013.01)

(58) Field of Classification Search
CPC ... G05D 2201/0201; G06Q 50/02; E02D 1/04
See application file for complete search history.

(56) References Cited

U.S. PATENT DOCUMENTS

| | | | | |
|---|---|---|---|---|
| 5,913,915 A | * | 6/1999 | McQuinn | A01B 79/005 700/231 |
| 5,974,348 A | * | 10/1999 | Rocks | G01S 1/70 348/120 |
| 6,016,713 A | * | 1/2000 | Hale | A01B 79/005 73/864.45 |
| 6,070,539 A | * | 6/2000 | Flamme | A01B 79/005 111/177 |
| 6,138,590 A | * | 10/2000 | Colburn, Jr. | A01B 79/005 111/118 |
| 6,164,223 A | * | 12/2000 | Eriksson | A01B 79/005 111/200 |
| 2004/0144021 A1 | * | 7/2004 | Keller | A01C 7/042 47/1.01 P |
| 2006/0098094 A1 | | 5/2006 | Lott | |
| 2008/0047475 A1 | * | 2/2008 | Stehling | A01C 7/208 111/69 |
| 2011/0106422 A1 | | 5/2011 | Gould et al. | |
| 2014/0033972 A1 | | 2/2014 | Meyer et al. | |
| 2014/0324490 A1 | * | 10/2014 | Gurin | G06Q 10/0631 705/7.12 |
| 2014/0379228 A1 | | 12/2014 | Batcheller et al. | |
| 2015/0090166 A1 | | 4/2015 | Allgaier et al. | |

OTHER PUBLICATIONS

"International Search Report and Written Opinion, PCT/US2016/026967".

* cited by examiner

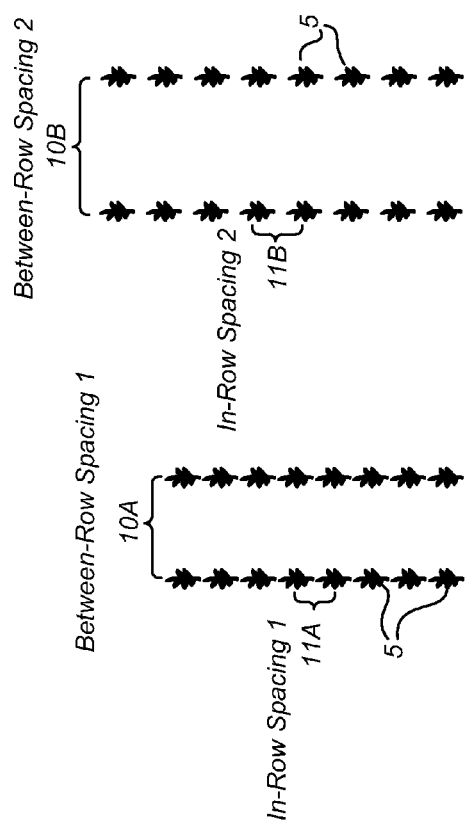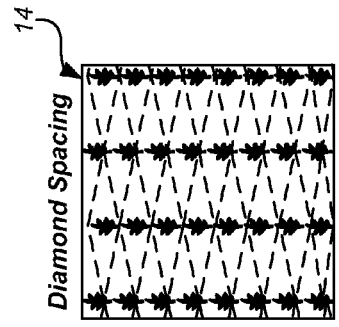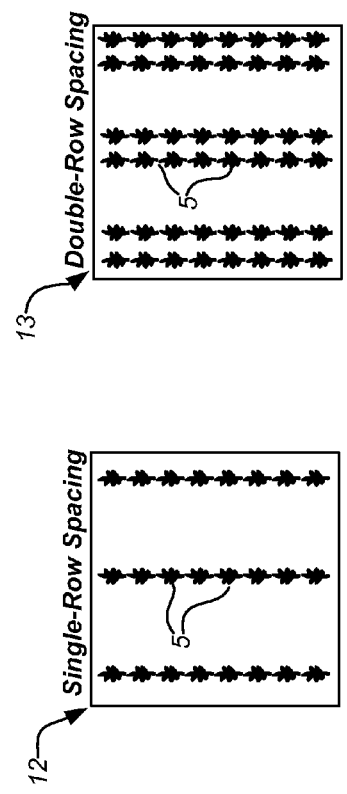

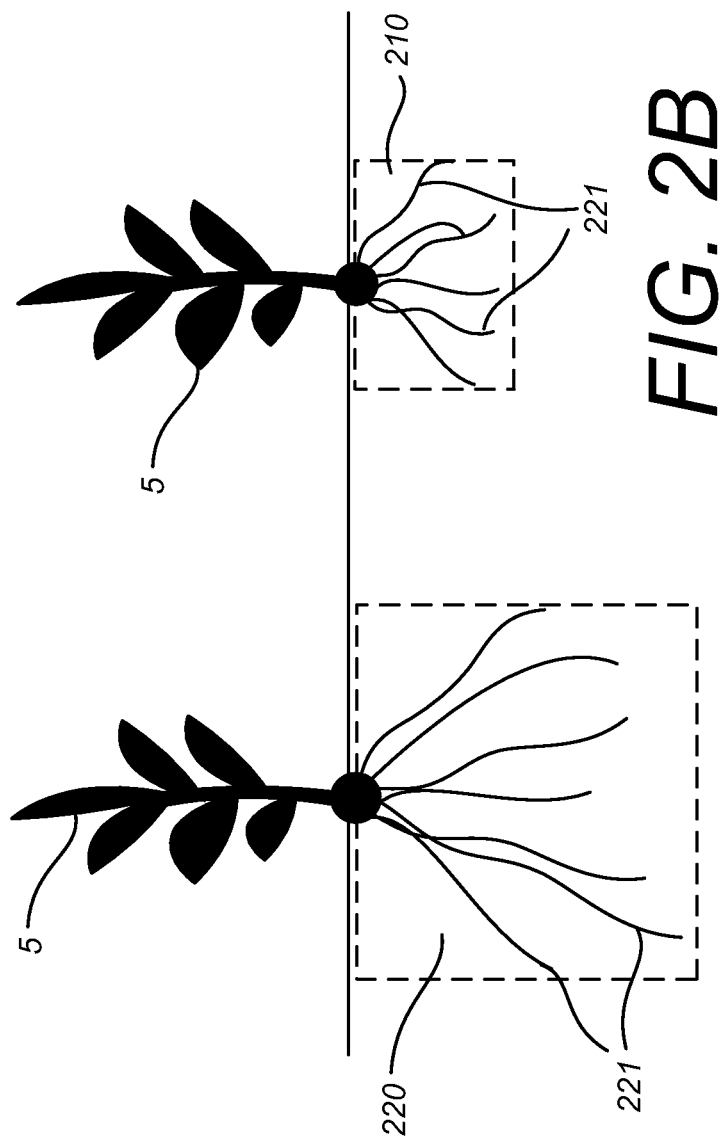

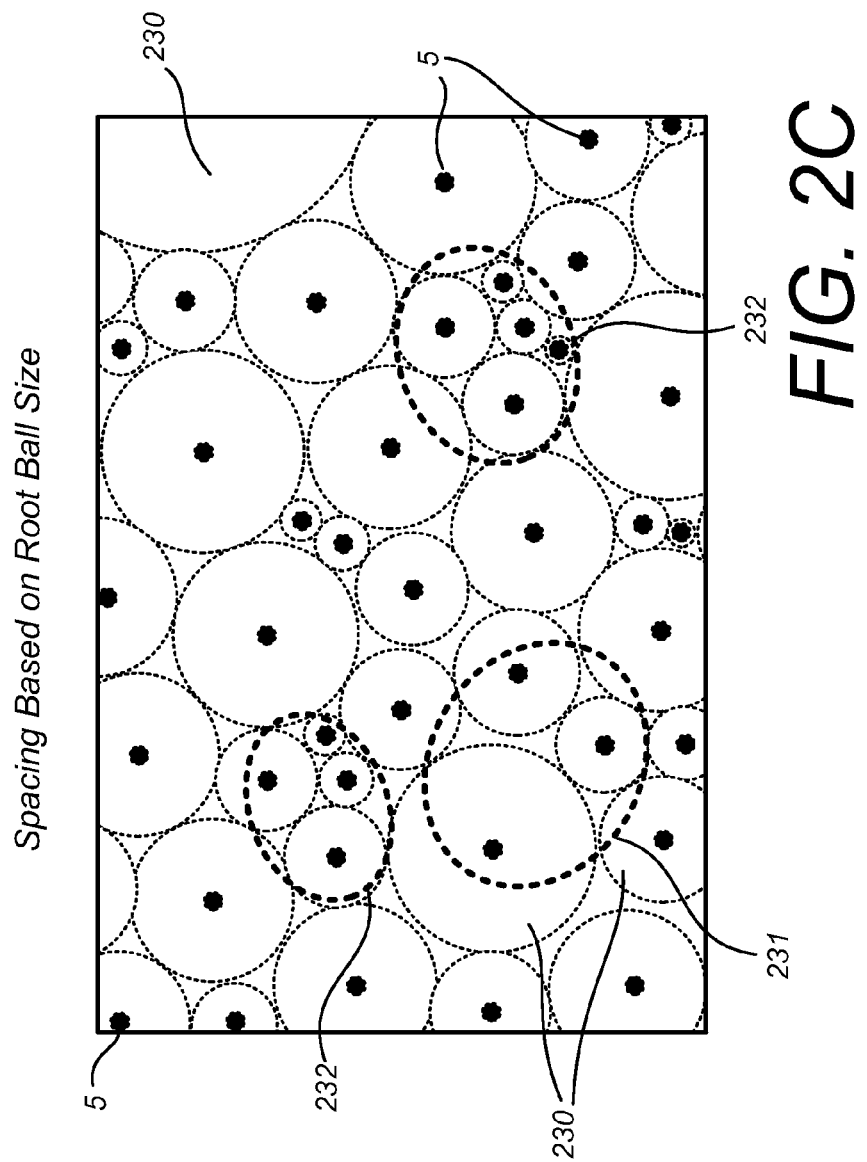

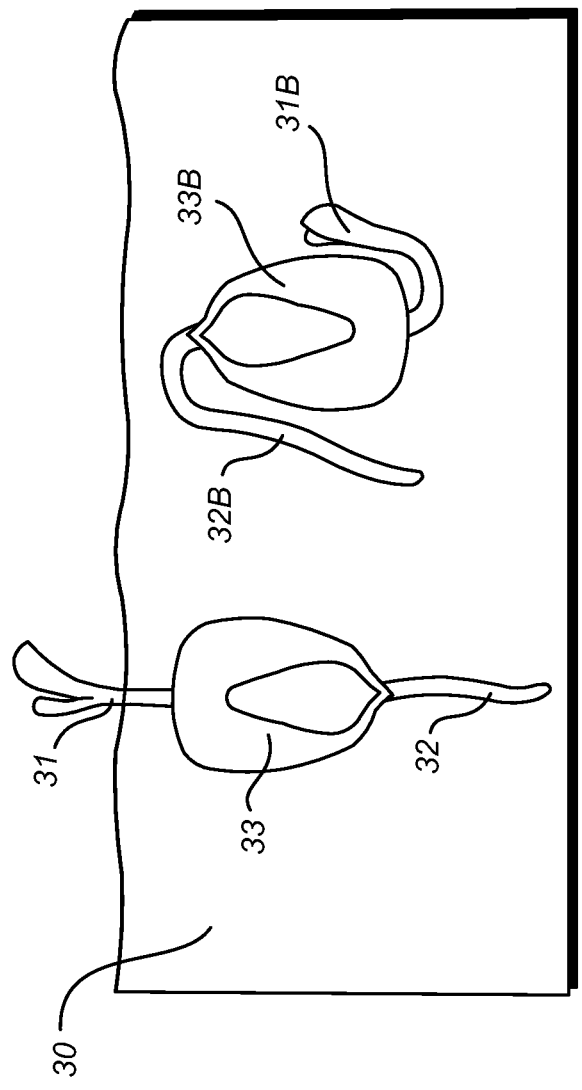

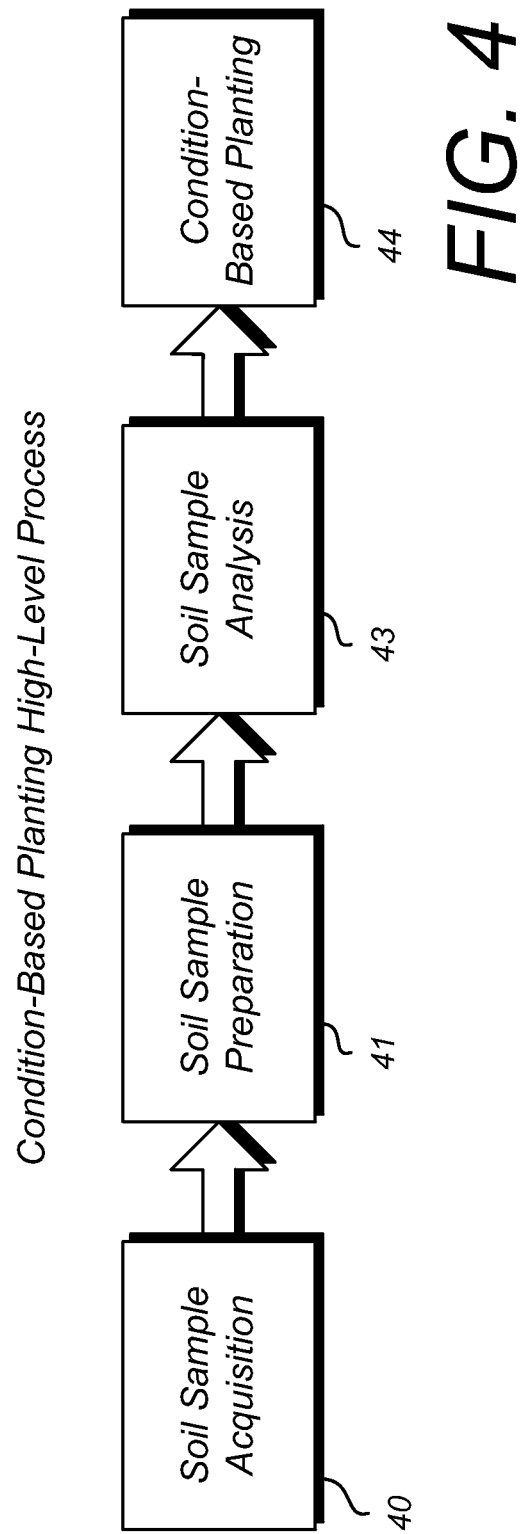

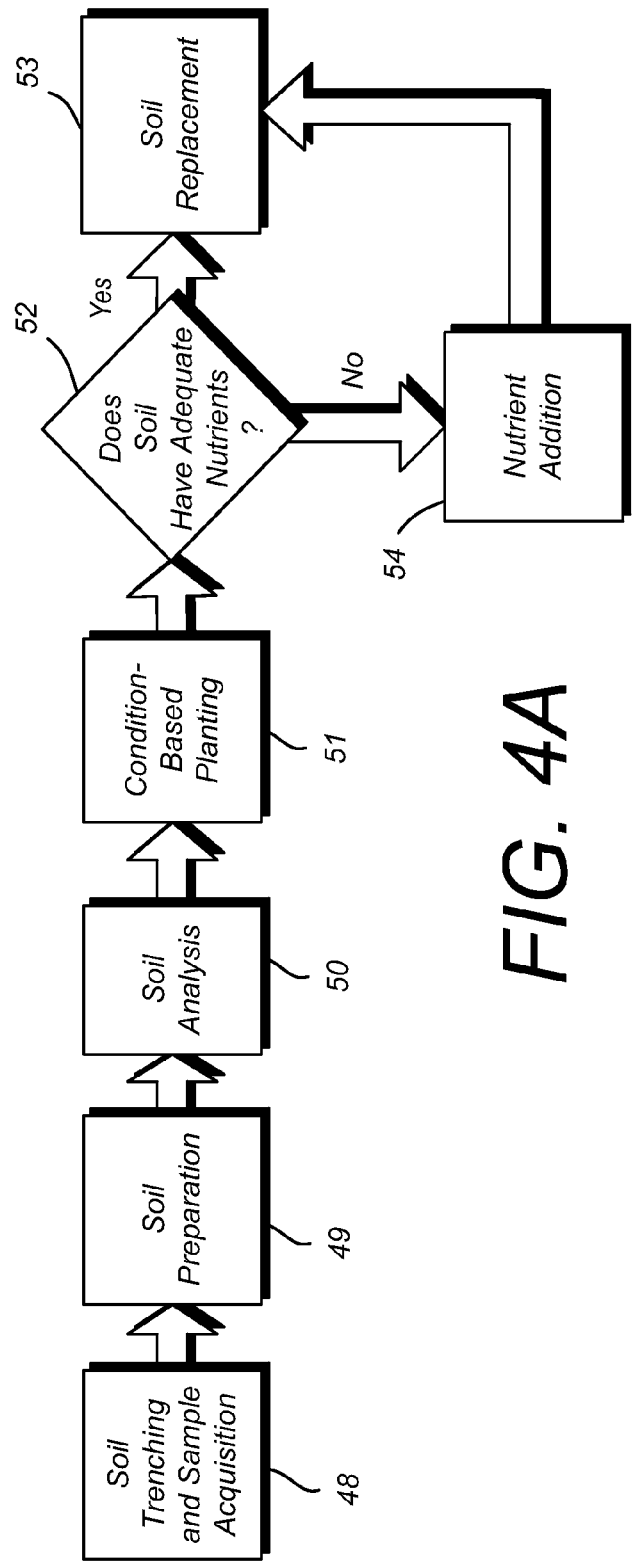

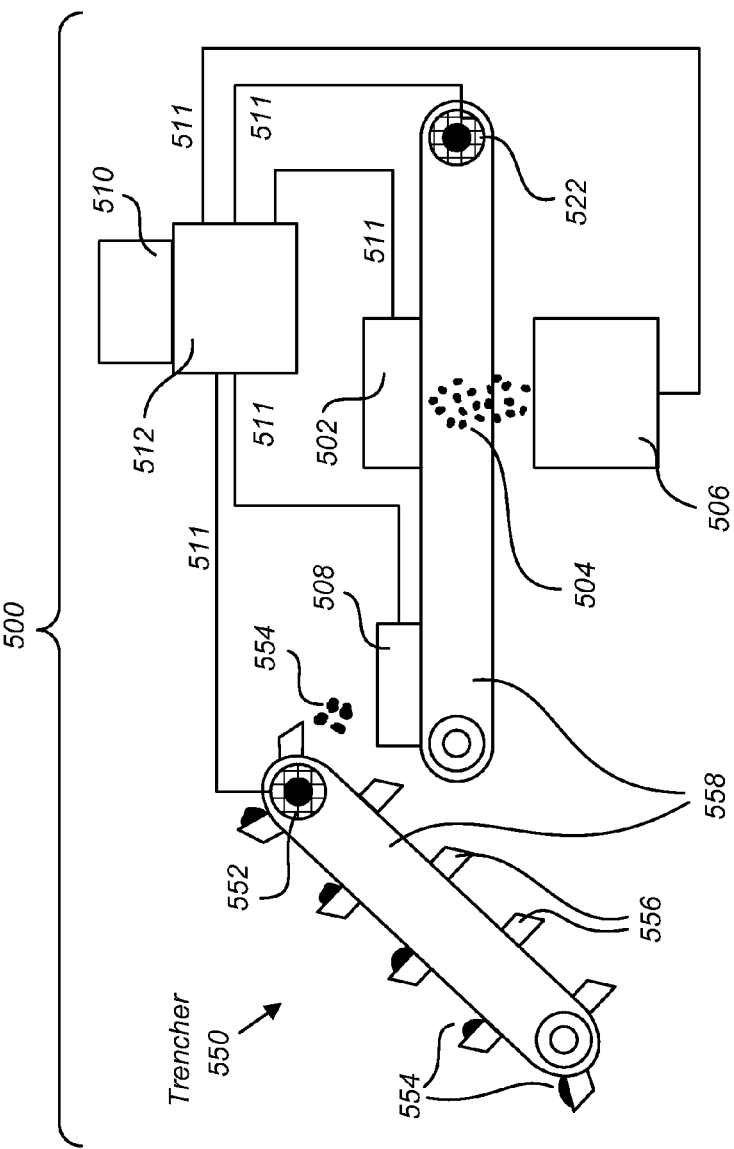

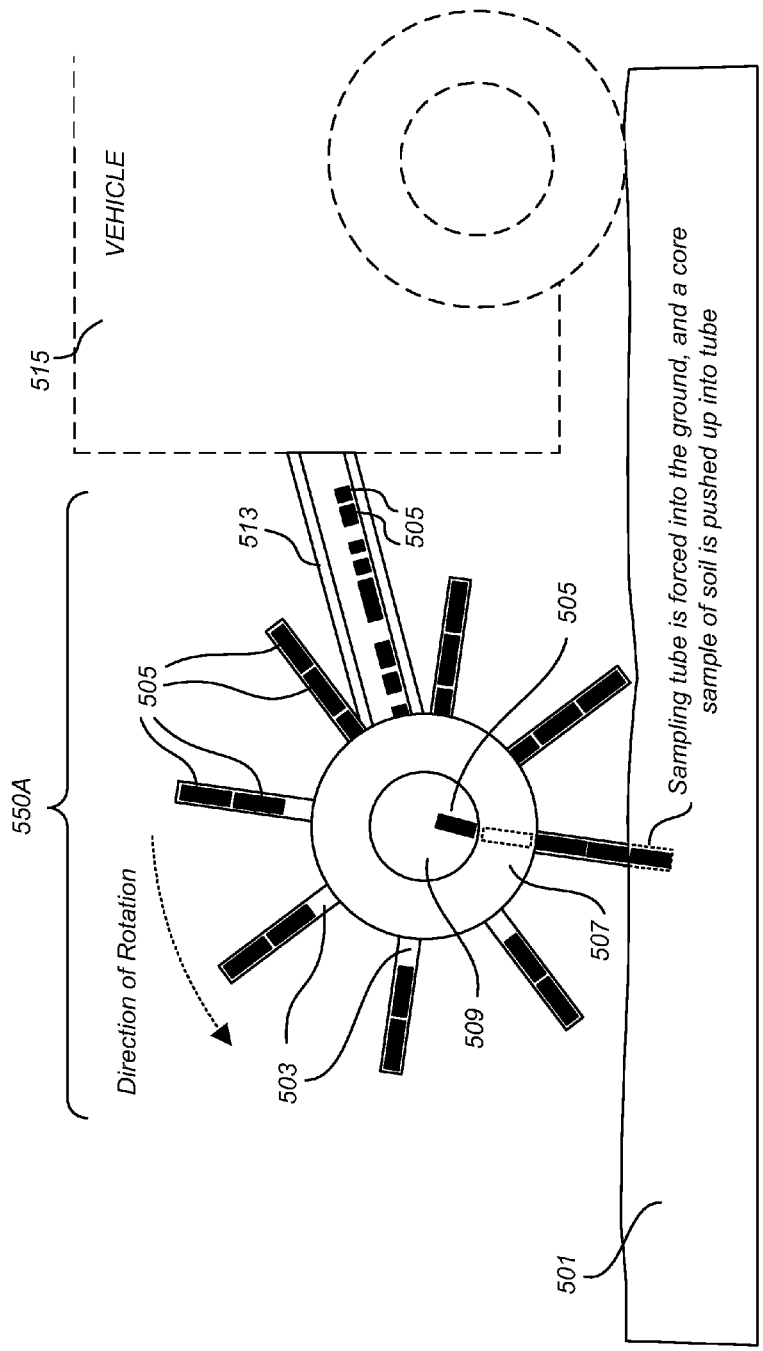

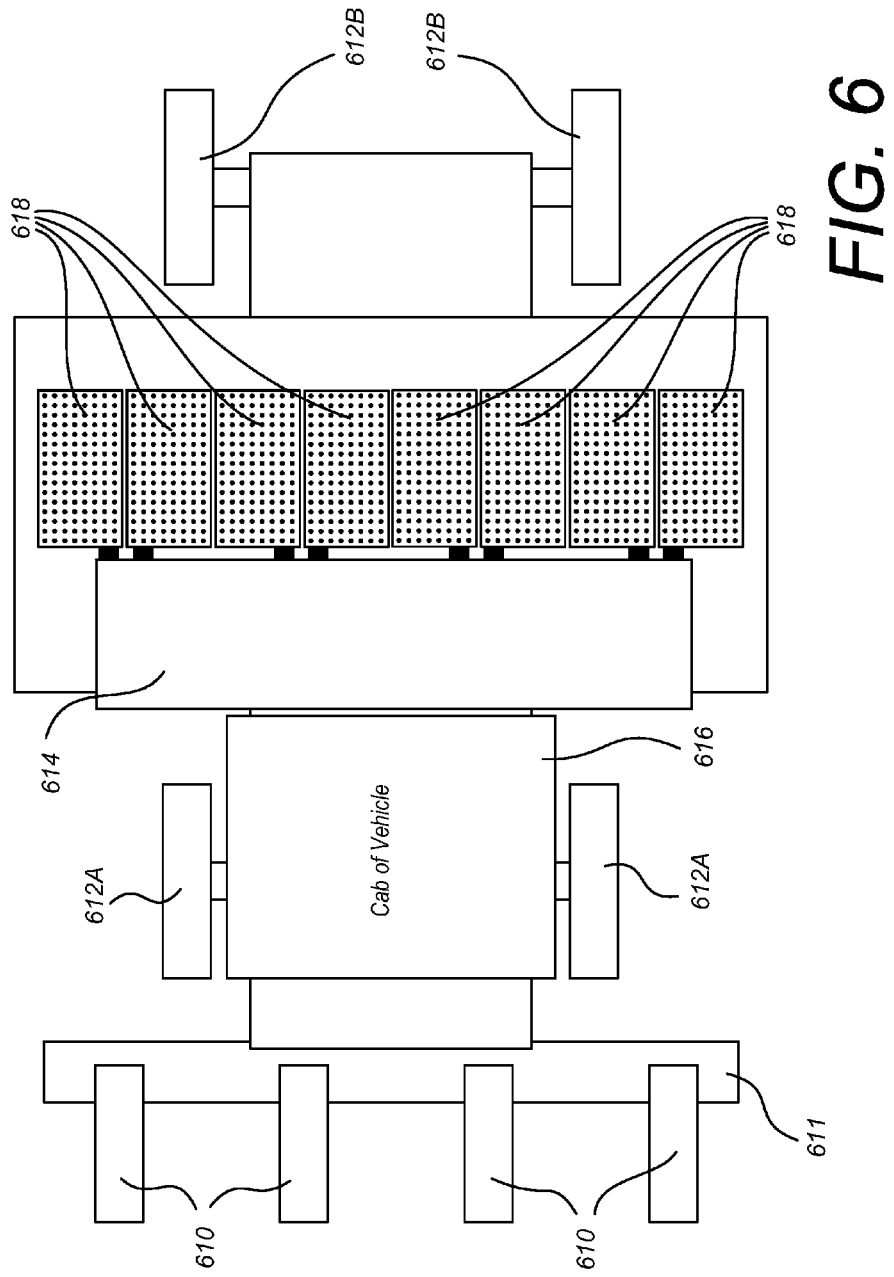

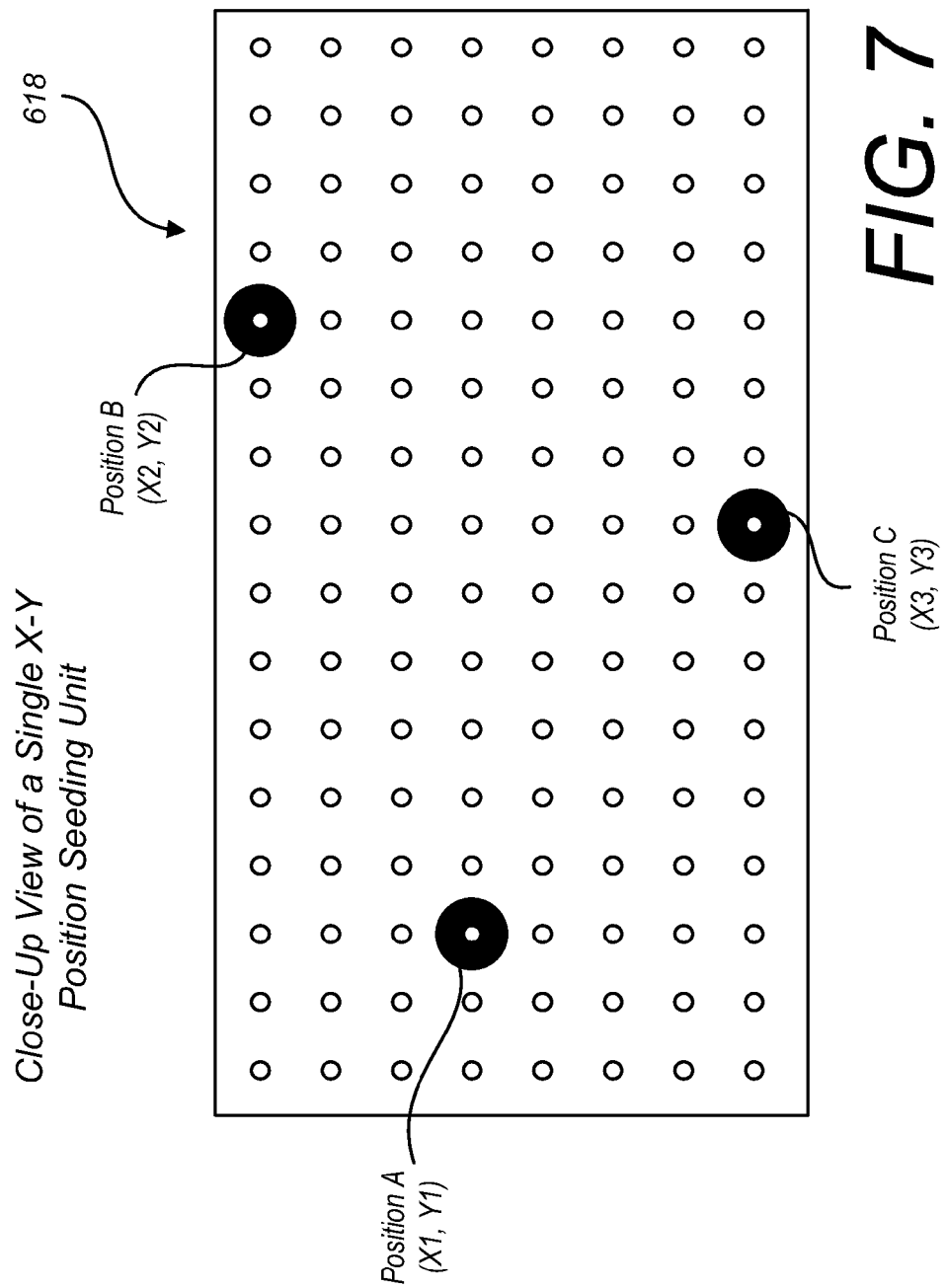

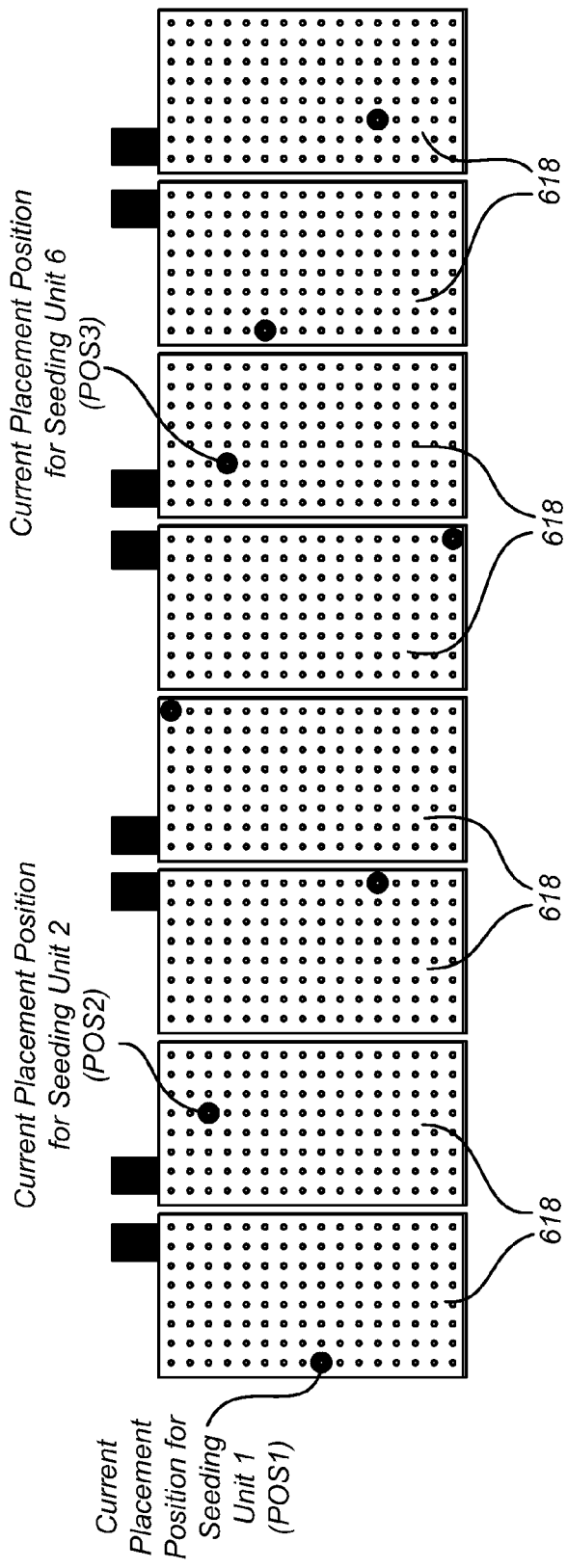

One Embodiment of an Autonomous Condition-Based Planting System

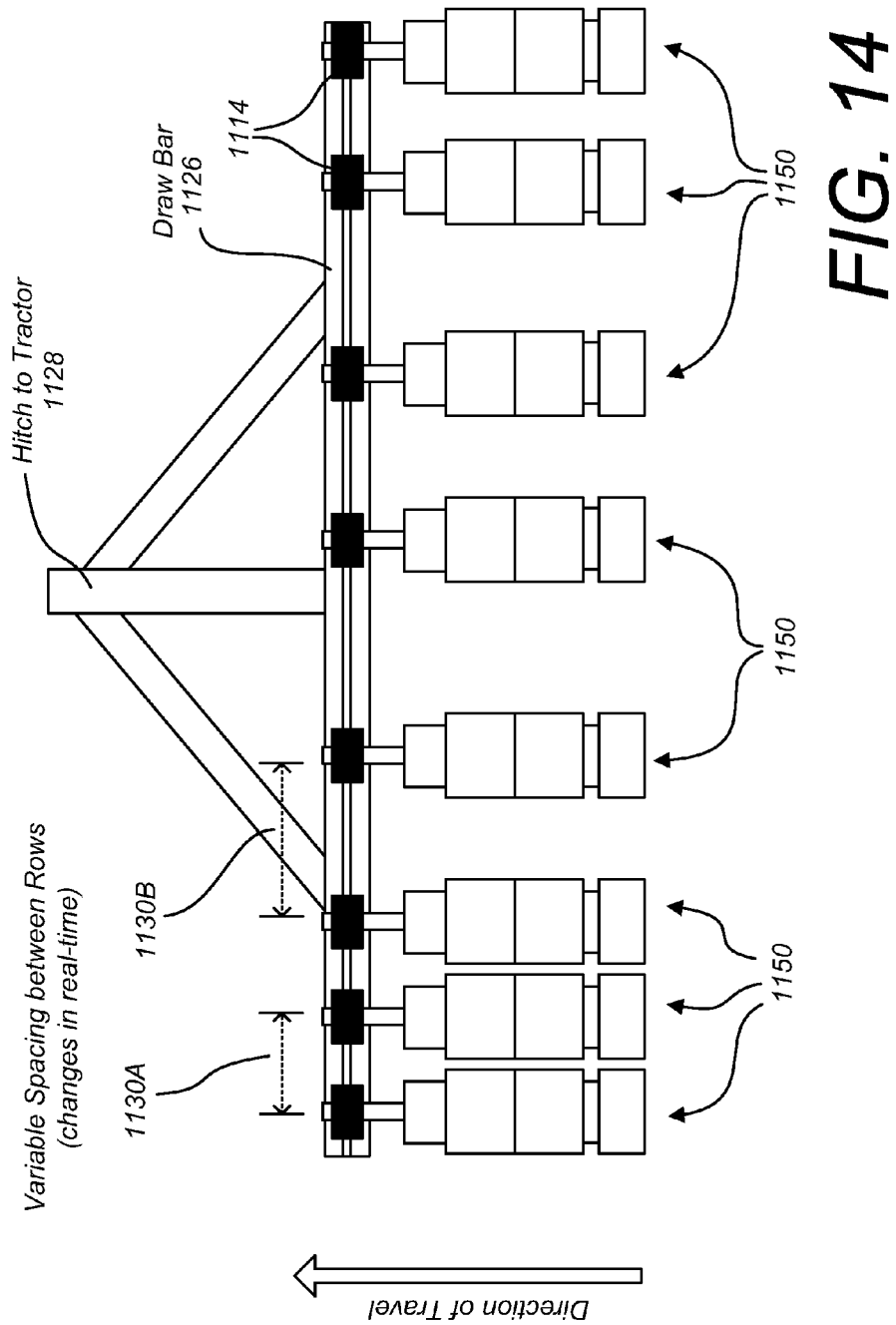

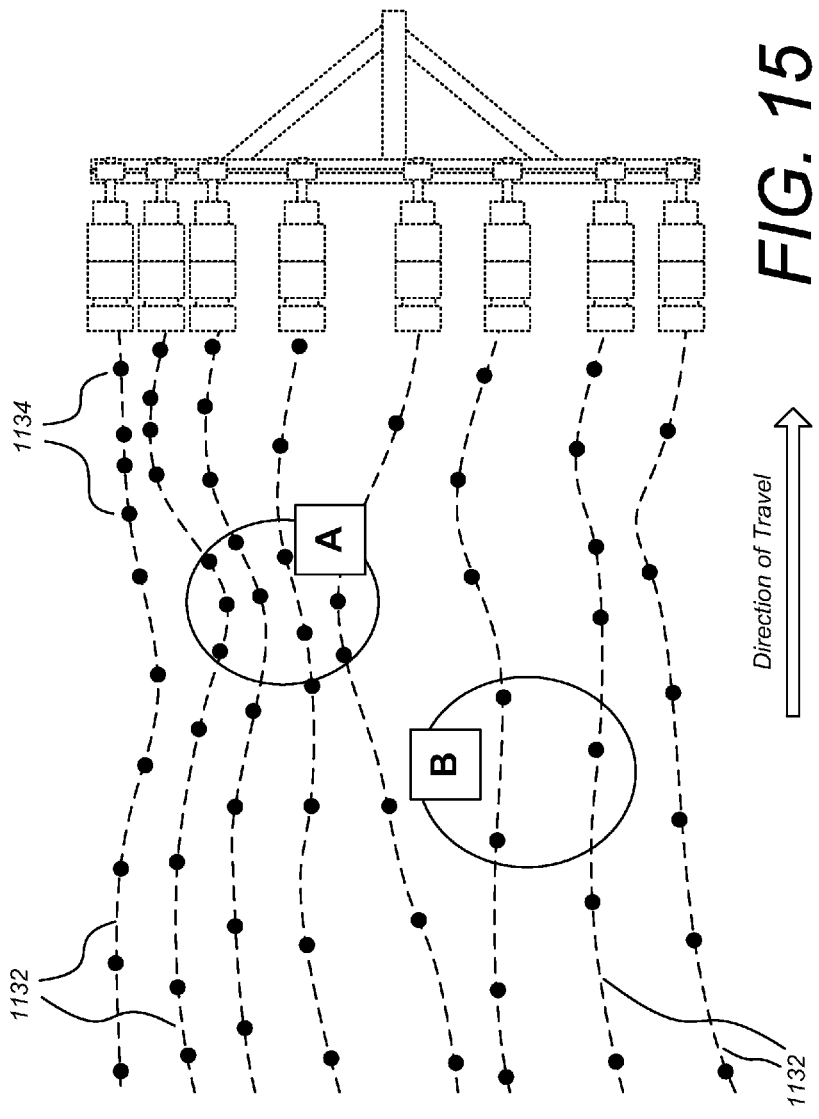

METHOD AND SYSTEM FOR OPTIMIZING PLANTING OPERATIONS

CROSS REFERENCE TO RELATED APPLICATIONS

This patent application claims the benefit of U.S. Provisional Patent Application No. 61/837,980, entitled, "PICK-AND-PLANT AGRICULTURAL MACHINE AND METHOD OF USE" by Batcheller, filed on Jun. 21, 2013, and this application also claims the benefit of U.S. Provisional Patent Application No. 61/977,556, entitled, "PICK-AND-PLANT AGRICULTURAL MACHINE AND METHOD OF USE" by Batcheller et al., filed on Apr. 9, 2014, both of which are incorporated herein by reference.

BACKGROUND OF THE INVENTION

1. Field of the Invention

This invention relates to the field of precision agriculture, and specifically to a system and method for the automated placement of crop seed in specific locations to allow for optimal growth and yield.

2. Description of the Related Art

Increasing the yield of an agricultural crop translates directly into increased profits for a farmer or operator. Increasing yield can be achieved in a number of ways, including applying fertilizers to stimulate growth, irrigating the crop during dry conditions, removing unwanted plants (weeds) that compete with the seed crop for survival and make it harder to harvest, applying pesticides to protect the crop against insects and other threats to the plant, and rotating crops to best utilize and replenish vital nutrients in the soil and to mitigate the build-up of pathogens that are attracted to a single type of crop.

All of the above practices are commonplace in agriculture, and are effective to varying degrees. Although these methods are effective, there is always a push to continue to increase the yield potential of a crop by finding new ways to create more positive conditions in which the crop can grow.

Unfortunately, current farming practices are inherently limiting when trying to further increase yield. The physical width and dimensions of the tractors, implements, and harvesting equipment used in agriculture dictate that seeds be planted in the ground in rows with standard spacing. Over the years, row spacing has decreased such that more plants can be grown for a given area. Unfortunately, limiting seed placement to straight rows of a certain spacing does not allow for the maximum yield output, as the soil's capacity to produce (its conditions, nutrient content, soil type, etc.) can vary dramatically over a field and dictate the optimum seed spacing in any given area. Some areas of the soil in a field may have a higher capacity to retain or transfer moisture due to soil type, or higher nutrient content, and are thus better able to support a higher number of plants. Conversely, other areas of the soil may be lacking nutrients or the capacity to retain or transfer moisture, and so planting a smaller number of seeds may be warranted in these areas to eliminate competition for precious resources. Ideally, an agricultural machine would know which areas of a field are more conducive to supporting a large number of plants, and which areas are less conducive, and plant seeds in a pattern to maximize crop yield.

What is needed in the art is a method and system for detecting the soil conditions in an agricultural field in real-time, or near real-time, as a vehicle moves through the field, and to adjust the plant spacing dynamically in order to optimize the use of the detected soil condition. Optionally, such a system could add nutrients along with the seeds based on the detected condition of the soil at the time of planting.

SUMMARY OF THE INVENTION

According to one aspect of the present invention, a soil sampling and analysis system is described comprising a vehicle, a ground-engaging device capable of obtaining a soil sample at a pre-determined depth mounted on the vehicle, a sample preparation system, a soil analysis device, where the soil analysis device performs one or more analysis steps on the soil sample, a location sensor, and a processing device, whereby the vehicle is capable of moving through a field and periodically acquiring soil samples, and combining the information on the soil conditions and the location information to create a map of soil conditions that exist in the area of land.

According to another aspect of the present invention, a soil sampling and analysis system is described comprising a vehicle, a ground-engaging device mounted on the vehicle capable of turning over a top layer of soil in a field to a pre-determined depth, an illumination device capable of emitting various wavelengths of light, a sensor capable of determining wavelengths of light reflected from the overturned soil, a location sensor, and a processing device capable of analyzing the light wavelengths reflected back from the overturned soil to determine the composition and/or condition of the overturned soil, whereby the vehicle is capable of moving through a field and periodically analysing the soil conditions, and combining the information on the soil conditions and the location information to create a map of soil conditions that exist in the area of land.

According to another aspect of the present invention, an agricultural planting system is described which comprises a soil sampling and analysis means, wherein soil samples are taken and analyzed in real-time during a planting operation to determine the conditions and nutrient content of the soil, and a planting system, wherein the planting system is capable of planting seeds in any arbitrary position on an X-Y plane directly beneath the planting system, whereby the data gathered from the analyzed soil samples is used to determine the optimal placement of seeds or plants in a field in order to take advantage of the soil conditions present and to optimize crop yield.

According to yet another aspect of the present invention, an agricultural planting system is described which comprises a planting vehicle, wherein the planting vehicle is capable of planting seeds in any arbitrary position on an X-Y plane directly beneath the planting vehicle, and a soil conditions map, where the soil conditions map contains information on the conditions of the soil at each point in the field, whereby the information from the soil conditions map is used by the planting system to determine the best placement of seeds in a field to optimize crop yield.

According to yet another aspect of the present invention, an agricultural planting system is described which comprises a planting vehicle, wherein the planting vehicle has one or more smart row units, wherein the one or more smart row units is capable of moving perpendicular to the travel path of the vehicle within the width of the vehicle, and a soil conditions map, where the soil conditions map contains information on the conditions of the soil at each point in the field, whereby the information from the soil conditions map is used by the planting system to determine the best placement of seeds in a field to optimize crop yield.

According to another aspect of the present invention, an agricultural planting system is described which comprises a planting vehicle, wherein the planting vehicle is capable of planting seeds in any arbitrary position on an X-Y plane directly beneath the planting vehicle, a soil conditions map, wherein the soil conditions map contains information on the conditions of the soil at each point in the field, whereby the information from the soil conditions map is used by the planting system to determine the best placement of seeds in a field to optimize crop yield, and a nutrient system, wherein the nutrient system is capable of adding nutrients to the seed bed during the planting process and does so based on the nutrients required for the crop type and based on the current soil conditions of the seed bed.

These aspects and others are achieved by the present invention, which is described in detail in the following specification and accompanying drawings which form a part hereof.

BRIEF DESCRIPTION OF DRAWINGS

FIGS. 1A-1E illustrate various typical row patterns and arrangements used for planting seeds/plants in existing practice in the prior art.

FIG. 2B provides an illustration of how the size of a plant's root ball will vary based on the availability of nutrients in proximity to the plant.

FIG. 2C provides another illustration of an improved pattern for placing seeds/plants based on the calculated size of the root ball needed for the plant based on the soil conditions.

FIG. 3 illustrates how the orientation of a seed (how it is placed in the ground) can affect the time for germination of that seed.

FIG. 4 is a high-level block diagram showing the functional areas utilized by the condition-based planting machine of the present invention.

FIG. 4A is a high-level block diagram showing the functional areas utilized by an alternate embodiment of the condition-based planting machine of the present invention, where nutrients are added to the soil as needed based on soil analysis.

FIG. 5 is an illustration of one embodiment of a vehicle-mounted device used for taking soil samples in real-time.

FIG. 5A is an illustration of an alternate embodiment of a vehicle-mounted device used for taking soil samples in real-time.

FIG. 6 describes one embodiment of a condition-based planting machine of the present invention.

FIG. 7 is a top view of one embodiment of an X-Y position seeding unit of the present invention, illustrating how the location of the seed planting device can be moved in the X-Y plane to create the optimal planting pattern illustrated in FIG. 3.

FIG. 8 is a top view of a series of X-Y position seeding units being operated in parallel.

FIG. 14 is an illustration of a series of smart row units mounted on a draw bar of the condition-based planting implement of the present invention.

FIG. 15 is an illustration of how the condition-based planting implement of the present invention can be used to place seeds/plants in an optimal pattern based on current soil conditions.

DETAILED DESCRIPTION OF THE PREFERRED EMBODIMENT

Figure 2A:
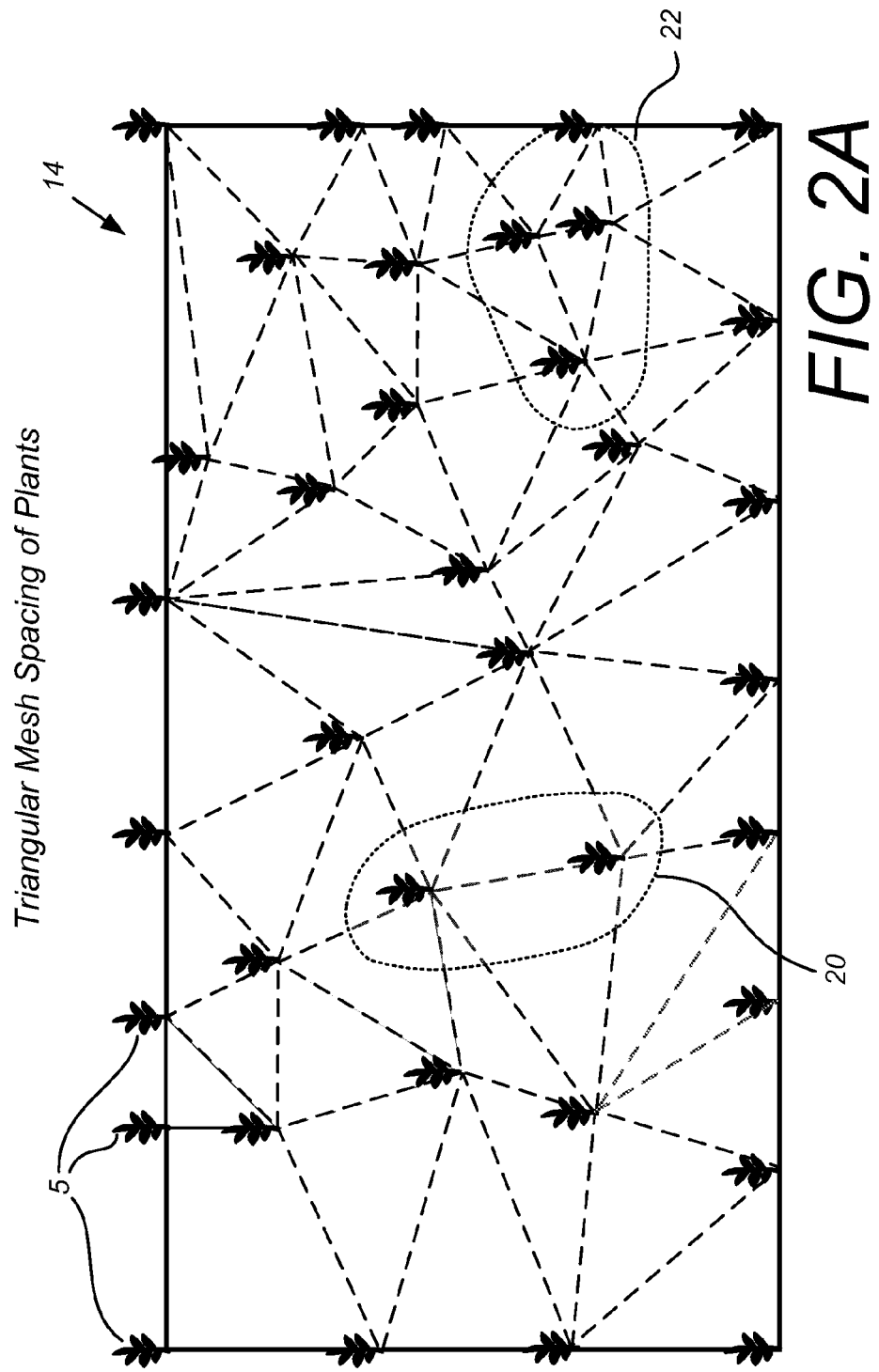
FIG. 2A provides an illustration of an improved pattern for placing seeds/plants based on the soil conditions at a given location.

With reference now to the drawings, and in particular to FIGS. 1A through 15 thereof, a new agricultural planting system embodying the principles and concepts of the present invention will be described.

The intent of the present invention is to create an agricultural planting system that will maximize crop yield and quality by being able to sense ambient conditions, including the conditions of the soil in which the seeds or plants are being placed, and to use this knowledge to determine the best spacing for planting.

Several factors can directly affect the yield of a crop. These factors include:
  Soil Type: Heavier, finer textured soil has better water-holding capacity than lighter, coarser textured soils, and can therefore support higher plant populations.
  Soil Fertility: High soil fertility levels are required to best support higher plant populations.
  Moisture: Some areas of a field may receive more moisture than others, enabling them to support higher plant populations.
  Plant Spacing: By decreasing the spacing between plants and between rows, additional plants can be placed in the same field area.
  Hybrid Type: Certain plant hybrids are hardier than others and will tolerate high populations.
  Planting Date: An early planting date becomes more important with higher plant populations.

Seed Orientation: Random orientation of the seed in the ground may cost yield due to non-uniform emergence times, as the root and shoot have to work harder to get where they are going in some orientations than others.

With all of the above factors taken into consideration, the goal is to plant the maximum number of plants per area that can be properly sustained and nourished for the given soil condition until harvest time.

Present farming practices dictate that most crops be planted in rows with fixed dimensions based on the size of the planting machine (spacing and width of wheels, for example) and the machines capabilities. The row spacing is set prior to planting and cannot be varied "on the go".

In an attempt to maximize plant population, farmers and agricultural original equipment manufacturers (OEMs, who make large agricultural vehicles and implements) have experimented with changing the arrangement and spacing of the rows.

It should be noted that throughout this specification, the terms "seed" and "plant" (that is, the noun form of the word "plant") shall be considered interchangeable. If the specification talks about the placement of seeds, the same concepts can be applied to the placement of individual plants (that is, plants that have already germinated and sprouted beyond the seed stage, or plants which are grown through means other than seed planting, such as the placement of roots or bulbs into soil).

Referring now to FIGS. 1A-1E, we see examples of typical crop spacing used in current practice in agriculture. FIGS. 1A and 1B illustrate that the spacing between plants in the same row (the "in-row spacing" 11A, 11B) can be varied, as can the spacing between successive rows (the "between-row spacing" 10A, 10B). FIGS. 1A and 1B illustrate essentially the same concepts, but the in-row spacing 11B and between-row spacing 10B of FIG. 1B are greater than the in-row spacing 11A and between-row spacing 10A of FIG. 1A. These figures are included to illustrate how differences in spacing between plants and between rows can increase or decrease the number of plants or seeds placed per acre of field.

However, changing the spacing between plants or between rows is limited by the dimensions and capabilities of the equipment being used to do the planting. A significant change in the between-row spacing 10A, 10B may mean that the agricultural vehicle and/or implement used to do the planting, which has fixed dimensions, may no longer work. Spacing must be such that a vehicle can move through the field without crushing plants 5 as it moves, and is a function of the distance between neighboring seeding/planting units on the back of the vehicle.

FIGS. 1C, 1D, and 1E illustrate the three patterns used typically in current agricultural practice when planting a row crop. FIG. 1C illustrates single-row planting 12, the oldest and most familiar style, in which single rows of plants 5 are positioned in a field based on the dimensions of the planting and/or harvesting machines that will be used. FIG. 1D shows an attempt to increase the number of plants 5 on a field by using double row spacing 13; that is, adding a second row of plants 5 right next to each single row, while still respecting the overall dimensions of the row spacing dictated by the agricultural machines. FIG. 1E shows a diamond pattern arrangement 14, in which alternating rows of plants 5 are offset so that each plant 5 sits at the vertex of an equilateral triangle (half of a diamond as shown in FIG. 1E). This equilateral triangular spacing represents the current best effort in spacing plants 5, so that each plant 5 is identically spaced from every other plant 5, allowing each its own "space" and allowing rows to be placed closer together without the overcrowding and competitive environment for plants 5 seen in double-row spacing.

In order to maximize plant population, plants should be placed as closely together as possible, irrespective of any fixed row spacing. The ideal spacing is a triangle where the length of each side is determined by the soil conditions where the seed is planted. FIG. 2A shows an optimal triangular mesh plant spacing 14 that is determined based on the soil conditions in the field during planting, and not on the dimensions of the planting vehicle. Areas in the field that have soil conditions that are more optimally suited for sustaining larger plant populations (for example, they have finer textured soil, receive more moisture, and/or have adequate quantities of the necessary nutrients) will be planted with more seeds/plants than areas in the field that do not have the right soil conditions. This is illustrated in FIG. 2A, where a dashed line is shown on the right-hand side of the figure drawn around four plants 5 (area 22), showing closer plant 5 spacing, and a dashed line near the middle of the figure drawn around only two plants 5 (area 20), showing more distant spacing.

In order to determine the proper spacing of plants based on soil conditions, as shown in FIG. 2A, the conditions of the soil that exist right before planting time, as close to planting time as possible, must be known. Soil sampling can be done prior to planting to determine the soil conditions in each location. Ideally, this soil sampling capability will be built into the planting vehicle so that soil samples can be taken and analyzed in real-time, as planting is occurring. Additional detail regarding embodiments of such a soil sampling system are presented in later figures, and will be discussed shortly.

FIG. 2B provides an illustration of how the soil conditions can affect the number of plants that can be sustained in a given area in a field. FIG. 2B shows two different plants 5 each growing in soil of different conditions. The plant on the left of FIG. 2B is growing in soil conditions that are not very nutrient-rich (area 220). The plant on the right of FIG. 2B is growing in soil conditions that are much more nutrient-rich (area 210).

The roots 221 of the plant 5 growing in the nutrient-poor soil 220 have to spread out farther in order to try to find the nutrients it needs to grow, thus creating a large root ball for the plant 5.

The roots 221 of the plant 5 growing in the nutrient-rich soil 210 do not have to travel far in order to find the nutrients it needs to grow, thus creating a relatively small root ball.

FIG. 2C shows an alternate version of the optimal spacing shown in FIG. 2A, but this time the spacing is shown based on the calculated root ball size of the plants, which is calculated by the planting system in real time based on the crop type and the current soil conditions of the area. The dashed circles 230 represent the predicted size of the root ball surrounding each plant 5. Areas of nutrient-rich soil 232 will have more densely packed root balls 230. Areas of nutrient-poor soil 231 will have more sparsely packed root balls 230.

Ideally, soil characteristics would be sensed on the go and adjustments to seed spacing made in real time, with both seed placement and seed orientation taken into consideration. FIG. 3 illustrates the importance of seed orientation in some cases, such as with corn seed, as shown. When corn seeds are planted upside down or sideways they have to expend energy to redirect the root and shoots for correct orientation. This puts one plant at a slight disadvantage to its neighbors, and can have a detrimental yield effect in certain soil conditions. The corn seed 33 shown on the left of FIG. 3 has the correct orientation, so that the root 32 of the plant emerges down, into the ground, and the shoot 31 emerges up, out of the top of the seed 33, where it continues to push out of the ground seeking the sun. The corn seed 33B on the right side of the figure has been placed upside down in the soil, forcing the root 32B to travel farther (traveling out around the seed 33B) to seek nutrients within the ground, and forcing the shoot 31B to do the same, seeking the sun and air of the atmosphere.

The rotation of the seed in the ground, relative to other neighboring seeds, is also important. If all corn seeds were planted with parallel orientation of the minor axis, maximum sunlight would be available to adjacent plants through the early growth cycles inasmuch as all corn plants leaf through their initial growth cycles with the leafs oriented towards that axis.

An ideal agricultural planting machine will be able to take soil samples on-the-go, just before the soil is seeded, and will pick the proper location to maximize crop potential and yield, and will be capable of placing individual seeds with a known, selected orientation and rotation in the soil.

This type of placement is done today in the electronics manufacturing industry. Programmable, robotic machines called "pick-and-place" machines can pick a component such as a resistor, capacitor, or integrated circuit off of a reel or a bin of such parts, move to a specified location above a printed circuit board specified in X-Y coordinates, and place that electronic component with a known orientation and rotation. Similarly, an idealized planting machine would be able to pick up a seed, move it to a specific location in X-Y coordinates in the field (perhaps based on detected soil conditions), and plant the seed in the ground with the seed having the ideal orientation and rotation. Because of its similarity to the pick-and-place machines of the electronics industry, such an agricultural planting machine could be referred to as a "pick-and-plant" machine.

The pick-and-plant embodiment is one embodiment of the condition-based planting system of the present invention and will be discussed briefly. It should be noted that the "pick-and-plant" version or embodiment of the present invention is not the only embodiment, and other alternate embodiments will be discussed later in this application. Unless otherwise specified herein, all figures and discussion should be considered to apply to all embodiments of the present invention, including the pick-and-plant embodiment, the smart row unit embodiment to be discussed later, or any variation on these machines that still meets the intent of the present invention as claimed.

A condition-based planting machine of the present invention would need to be able to perform four major functions. FIG. 4 shows the four basic functions of such a machine. It should be noted that some variations of this process flow exist and could be made without departing from the intent of the present invention. It should also be noted that the processes shown in FIG. 4 could be done at separate times or with multiple machines. For example, a separate soil sampling machine could pass over the field and create a map of soil conditions, and then present that information to a separate condition-based planting machine at a later time, perhaps by wireless data transfer or direct download. For the purposes of discussion, however, we will assume that FIG. 4 and subsequent, related drawings will be describing the embodiment in which all functions are done by one machine, unless specifically stated otherwise.

Referring now to FIG. 4, the first step in a condition-based planting process would be the acquisition of soil samples 40.

Ideally, this step or subprocess is designed such that a soil sample can be taken quickly at any point in the field where planting is to be done. Depending on the cost and complexity of the implementation, however, it may be acceptable to take a series of soil samples at small and regular intervals in a field, and to create a map that uses these points of information and interpolates the conditions that might exist between these periodic samples.

Soil samples are ideally taken at the depth where the seed will be placed, and so the soil sampling system must be capable of penetrating or digging up the soil to the appropriate depth, or as close as possible to the proper depth. Additional details on various embodiments of a soil sampling subsystem will be discussed with FIG. 5 through FIG. 5F.

Following acquisition of the soil samples, the soil samples must be prepared for analysis, as shown in step 41 in FIG. 4. Soil sample preparation consists of the steps needed to prepare soil samples for analysis. Preparation may comprise, but not be limited to, functions such as removal of debris, selection of a suitably-sized sample, handling to break up large clumps and distribute the sample evenly, application of chemicals as needed to aid in analysis, and/or conveyance to the soil analyzer.

Following preparation of the soil samples, the prepared sample is fed into the soil sample analyzer 43. The soil sample analyzer 43 will use various techniques known to industry to determine the soil type, moisture level, and chemical/nutrient content of the given sample. One such technique is a spectral analysis of the components in the sample using Raman spectroscopy, a spectroscopic technique used to observe the vibrational, rotational, and other low-frequency modes in a sample. Raman spectroscopy relies on the inelastic scattering (Raman scattering) of monochromatic light from a laser to identify various chemical compounds in the sample. A Raman spectroscopic analyzer could be developed using micro-electromechanical systems (MEMS) and a line-narrowed, high performance 785 nanometer stabilized diode laser.

Various other techniques may be used to identify the nutrients and moisture content in the soil sample without varying from the inventive concept presented herein.

The goal of the chemical analysis of the soil sample will be to identify, at a minimum, the percent concentration or total amount of the following major nutrients required for plant growth:
Nitrogen
Phosphorus
Potassium In addition to these three major nutrients, nine additional nutrients would ideally be determined as part of soil sample analysis. These include:
Sulfur
Magnesium
Calcium
Iron
Boron
Manganese
Zinc
Molybdenum
Copper Existing systems in the prior art today sometimes attempt to use soil data to determine the parameters of planting (when to plant, how much to plant, what type of seed, etc.) However, existing techniques used in precision planting provide only an approximation of actual field conditions, and can only be effectively done by hand in a very limited number of locations within a field. The prior art systems do not acquire samples in real time, as does the present invention. A very small set of samples may be taken by hand and sent to a laboratory for analysis. Getting results back from the lab may take a few days, if not longer, and therefore the data received is not only very limited in sample quantity and location, it is quite old by the time actual planting needs to be done.

Soil type would also be determined by the present invention. Different types of soil promote plant growth better than others. The three major types of soil are clay, sand, and silt, as well as combinations of each of these soil types. This information would be used to help determine the ideal planting pattern and spacing.

Soil information is stored along with the location in the field, which may be obtained from a global navigation satellite system (GNSS, such as the global positioning system or similar satellite-based systems) or from any other appropriate location source. A map showing soil conditions as they exist at various locations in the field is created.

It should be noted that there are various methods of obtaining soil samples 40 that will meet the intent of the present invention. Various means of collecting soil samples are described later in this specification, but it is important to point out now that a soil sample may be obtained by Raman spectroscopy, a technique described previously in this application, without actually needing to bring the soil into the planting machine for analysis. Ideally, this spectroscopic analysis would be done on soil that has been overturned at or near the depth where the seeds are to be planted, but it may be possible to determine the composition and content of the soil by doing the spectroscopic analysis on the topsoil before it is overturned. However, since the seeding process typically requires the overturning of the soil in order to plant the seed, it is likely that the analysis would be done on overturned soil.

If the Raman spectroscopic analysis is done with the soil in situ, then the soil sample preparation step 41 would consist entirely of turning the soil over and exposing soil at a depth close to the planting depth.

Once the soil sample analysis is complete, the soil conditions map is sent to the condition-based planting subsystem 44, the last process shown in FIG. 4. The planting subsystem then uses the data to determine the proper spacing and concentration of seeds/plants, and then plants based on this determination.

One embodiment of the condition-based planting machine as captured in FIG. 4 would comprise some or all of the following:

Real-time soil nutrient (chemical) sensors
Real-time soil moisture sensors
Real-time soil PH sensors
Real-time soil type determination (clay, sand, silt)
Real-time correlation of plant spacing to timing and weather conditions FIG. 4A is a high-level block diagram showing the functional areas utilized by an alternate embodiment of the condition-based planting machine of the present invention, where nutrients are added to the soil as needed based on soil analysis. In this alternate embodiment, instead of taking smaller discrete soil samples from the ground, the machine digs wider, continuous trenches as it moves through the field, pulling all of the soil removed from the trench into the machine for analysis and potentially for treatment through the addition of nutrients.

The process in FIG. 4A starts with soil trenching and sample acquisition 48, in which one or more soil trenching units are used to dig tracks or trenches in the soil, and the soil that is dug up is pulled up into the machine. The soil is then prepared in the second step of the process 49, which may comprise, but not be limited to, mixing of the soil, removal of debris, and transportation to a soil analysis subsystem. Soil analysis 50 is then performed, similar to the soil sample analysis in FIG. 4, followed by condition-based planting 51, in which the seeds/plants are planted in an appropriate location to take advantage of the existing soil conditions. Since the soil beneath the agricultural vehicle has been dug up in wide trenches, "planting" in this embodiment is determining the proper location within the existing trench it which to drop the seed or plant, or, optionally, to push it deeper beneath the trench, depending on the depth of the trench and the optimal planting depth. Finally, the soil must be replaced 53 to fill in the trench. First, based on the results of the soil analysis, it is determined if the existing soil captured from the trench has adequate nutrients 52 for optimal plant growth.

If the soil does not have adequate nutrient content, this embodiment of the machine has the option of branching off to a nutrient addition step 54, where chemicals such as fertilizers, pesticides, etc. or natural substances are added to the soil so that, ideally, the treated soil now has the required nutrients to optimize seed/plant growth, and then the soil is replaced into the trench and compacted if appropriate. If the soil already has an adequate level of nutrients, the soil is replaced 53 without the nutrient addition step.

As with the process shown in FIG. 4, the process shown in FIG. 4A could be done without actually pulling the soil into the machine. Soil trenching and sample analysis 48 would consist primarily of overturning the soil to an appropriate depth, soil preparation 49 may be combined into the soil trenching and sample analysis step 48, or may consist of a preparation step that can be applied to the soil in situ (for example, drying the soil or adding moisture to aid in the analysis process). The soil analysis might consist of Raman spectroscopy as previously described.

Figure 4B:
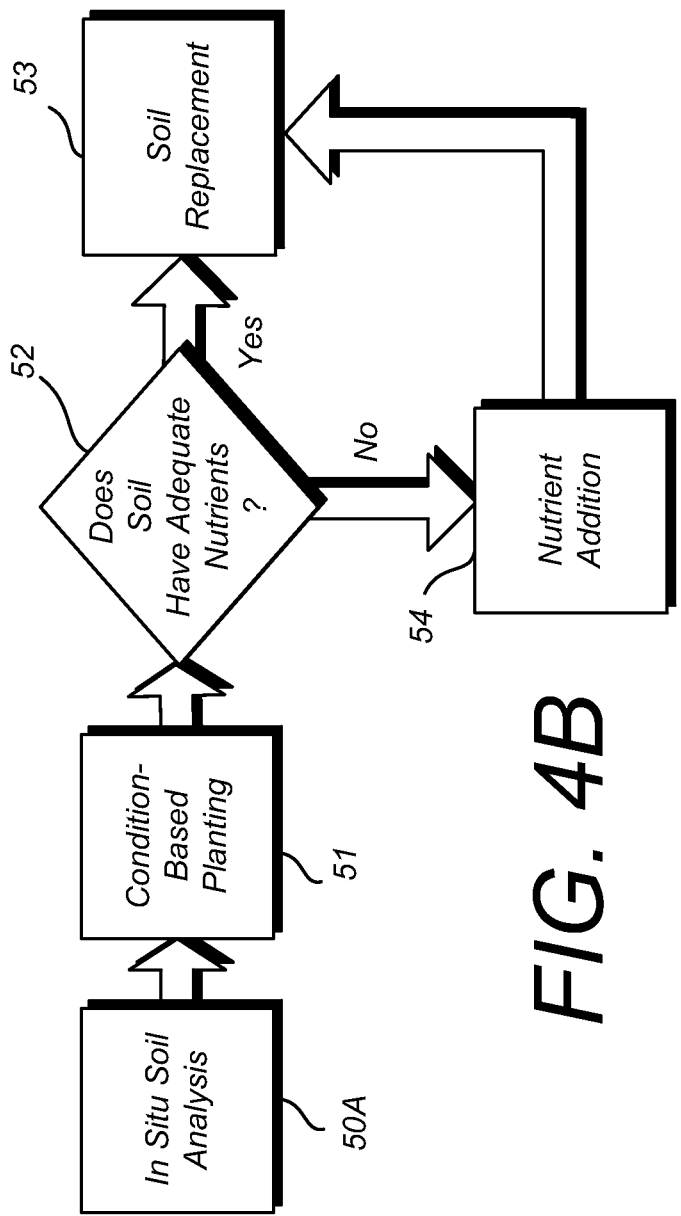
FIG. 4B is a high-level block diagram showing an alternate embodiment of the flow diagram of FIG. 4A in which the initial soil sampling tasks are replaced with a spectroscopic analysis of the soil.

For the purposes of clarity, FIG. 4B reproduces the flow of FIG. 4A but combines steps 48, 49, and 50 into a single new process 50A called soil analysis. This alternate version of the flow could be used when the soil analysis is done in situ (that is, when the soil is left in place on the ground, although it may be overturned or otherwise affected).

FIG. 5 shows one potential embodiment of a soil sampling subsystem 500. A trencher or similar ground-engaging device 550, driven by a motor 552 or similar mechanism, would dig into the ground, bringing soil samples 554 from the appropriate depth up from the ground in scoops 556 mounted on the trencher 550. Soil samples 554 would drop from the trencher scoops 556 into a mixer 508 which prepares the soil samples 554 for analysis. This may include sifting of the soil to remove debris and break up larger clumps as well as other processes as appropriate.

The prepared sample is then moved to an extractor 502, which removes an appropriate amount of material 504 from the prepared sample and delivers it to the soil analysis unit 506. All of the processes done by the soil sampling subsystem 500 are controlled by one or more electronic control units 512, and the information extracted for each sample is paired with a geographic location obtained from an integral location sensor 510 or a separate location source in communication with the soil sampling subsystem 500. The location-based sample data is used to create a soil conditions map, which will be used by the condition-based planting system (the pick-and-plant machine or an alternate embodiment) to determine how to plant the seeds/plants.

The embodiment of the soil sampling subsystem 500 shown in FIG. 5 shows the use of a trenching device 550 to dig up soil samples 554 (or to dig trenches as required by the trenching embodiment represented by the process in FIG. 4A). A trenching system is just one embodiment of a ground-engaging device for acquiring soil samples.

FIG. 5A shows an alternate embodiment of a soil sampling device 550A that could be used with the soil sampling subsystem of FIG. 5 in place of the trencher 550. This alternate embodiment of a soil sampling device 550A has a series of sampling tubes 503 which radiate out from a central hub 507, similar to spokes radiating out from a hub on a bicycle wheel. These sampling tubes 503 are hollow, rigid tubes which are pushed down into the ground 501 as a vehicle 515 on which the soil sampling device 550A is mounted moves forward. The soil sampling device 550A is mounted to the vehicle 515 by an attaching strut 513, which also serves as a conveyor to bring collected soil samples 505A from the device into the vehicle 515 and the soil analysis system.

As the hub 507 on the soil sampling device 550A of FIG. 5A turns, each sampling tube 503 is pushed into the ground 501 in turn, such that each tube 503 collects a "core sample" of soil 505 from the ground. As the wheel turns and additional core samples 505 are pushed into each sampling tube 503, the earlier collected core samples 505 are pushed up into the sampling tubes 503, until at some point the earliest collected samples 505 are pushed out into a central collection chamber 509 inside the hub 507. The samples 505 are mixed together in the collection chamber 509 and dropped onto a conveyor (inside the attaching strut 513) which take the samples 505 to the soil analysis system inside the vehicle.

FIGS. 5B through 5F show several alternate embodiments for a soil sampling device. These are provided to show than there are various devices that can be used to collect the soil samples as required by the present invention and the embodiments shown in these figures are neither complete nor intended to be limiting in any way.

Figure 5B:
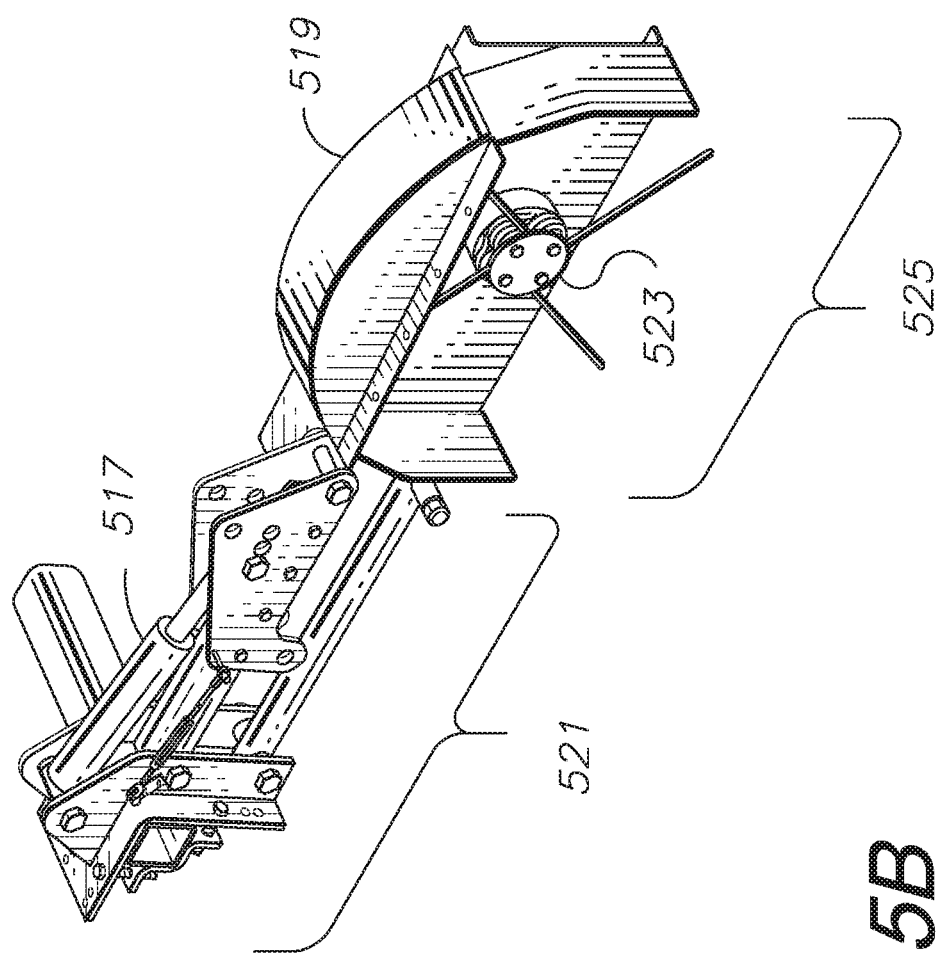
FIG. 5B is an illustration of an alternate embodiment of a vehicle-mounted device used for taking soil samples in real-time relying on a flailing mechanism in contact with the soil.

FIG. 5B is an illustration of an alternate embodiment of a vehicle-mounted soil sampling device used for taking soil samples in real-time relying on a flailing mechanism in contact with the soil. The device is mounted on an adjustable arm 521 and uses a hydraulic cylinder 517 to lower and raise the arm 521. On the end of the arm 521, a soil engaging head 525 is mounted. The soil engaging head 525 comprises a rotating wire flail 523, the purpose of which is to strike the soil and throw the soil up into a collection system inside the arm 521 for transport into the machine for analysis. The collection system is not shown in FIG. 5B but is essentially a conduit for moving the soil thus collected by the wire flail 523 and its implementation would be obvious to one skilled in the art. Optionally, a safety shield 519 is placed around the wire flail 523.

Figure 5C:
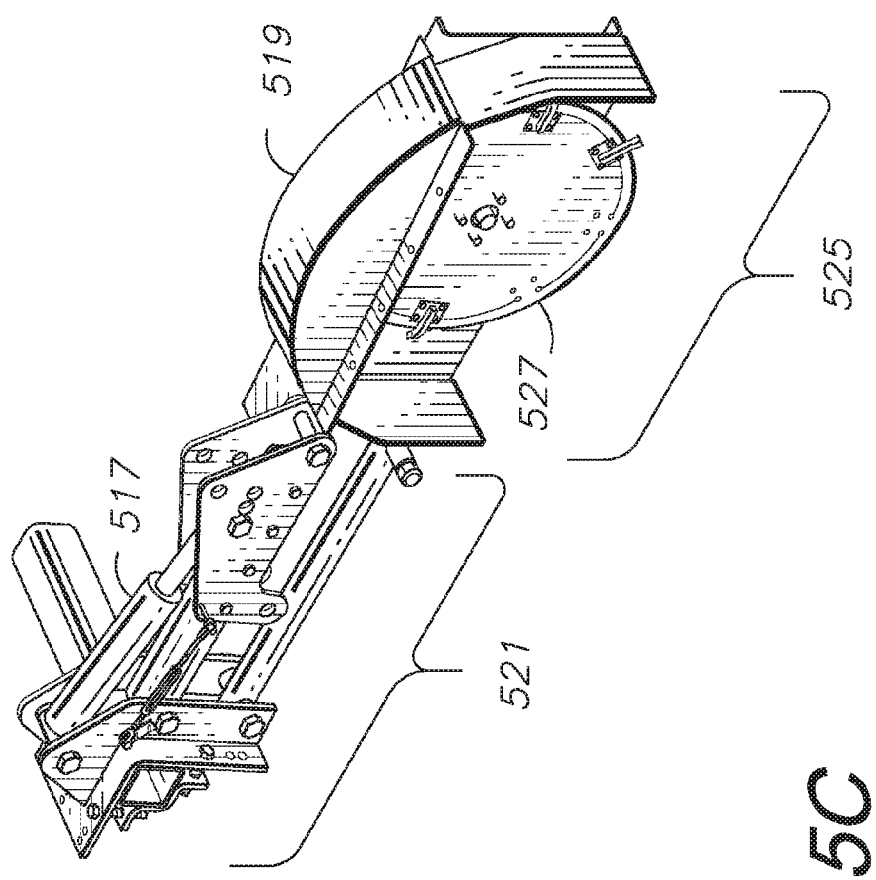
FIG. 5C is an illustration of an alternate embodiment of a vehicle-mounted device used for taking soil samples in real-time relying on an alternate type of flailing mechanism in contact with the soil.

FIG. 5C is an illustration of an alternate embodiment of a vehicle-mounted device used for taking soil samples in real-time relying on an alternate type of flailing mechanism in contact with the soil. The device is mounted on an adjustable arm 521 and uses a hydraulic cylinder 517 to lower and raise the arm 521. On the end of the arm 521, a soil engaging head 525 is mounted. The soil engaging head 525 comprises a spinning trenching disk 527, the purpose of which is to strike the soil and throw the soil up into a collection system inside the arm 521 for transport into the machine for analysis. The collection system is not shown in FIG. 5C but is essentially a conduit for moving the soil thus collected by the trenching disk 527 and its implementation would be obvious to one skilled in the art. Optionally, a safety shield 519 is placed around the trenching disk 527.

Figure 5D:
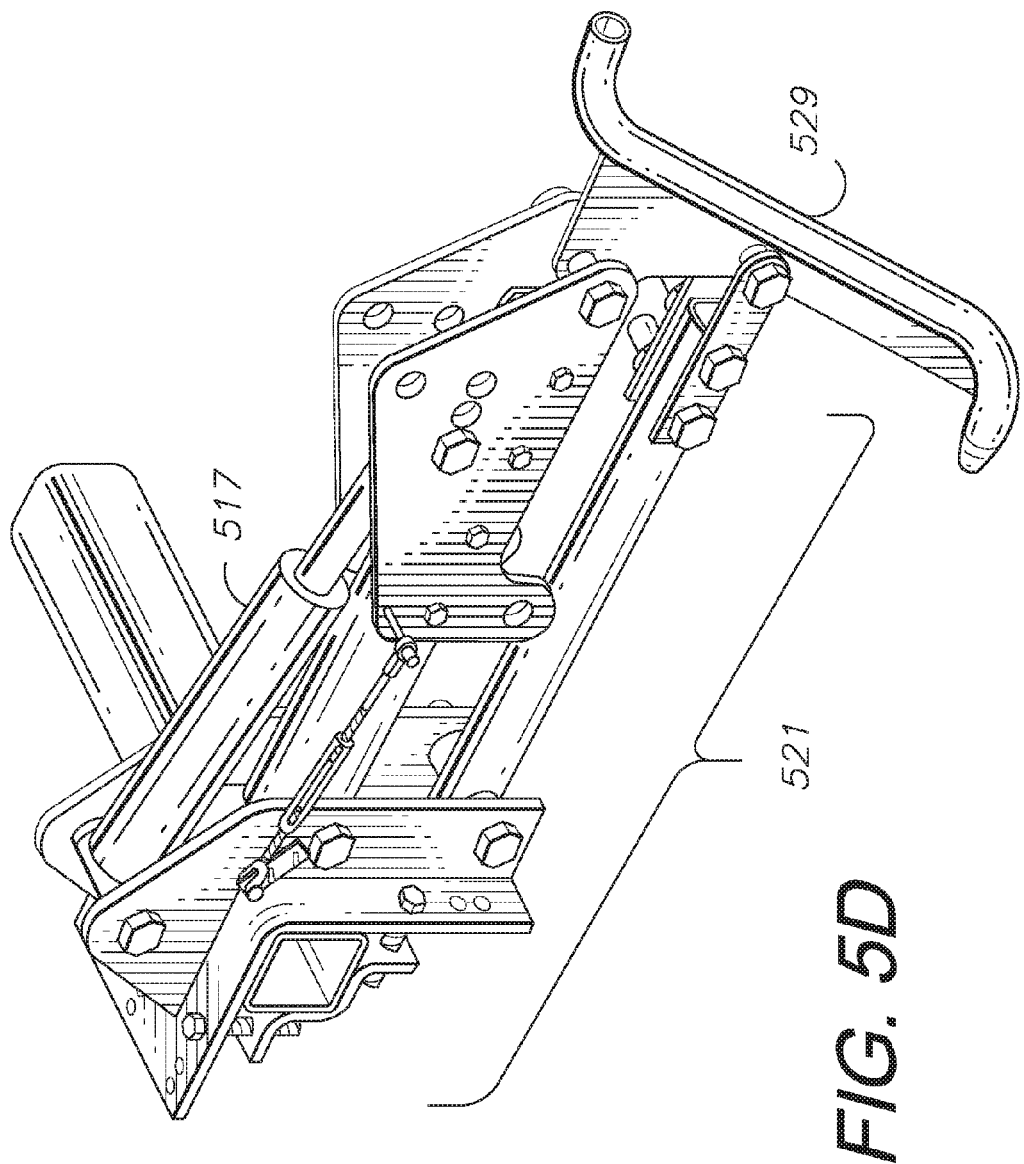
FIG. 5D is an illustration of an alternate embodiment of a vehicle-mounted device used for taking soil samples in real-time relying on a scooping mechanism.

FIG. 5D is an illustration of an alternate embodiment of a vehicle-mounted device used for taking soil samples in real-time relying on a scooping mechanism. The device is mounted on an adjustable arm 521 and uses a hydraulic cylinder 517 to lower and raise the arm 521. On the end of the arm 521, an s-shaped collection tube 529 is mounted such that the lower open end of the tube 529 can be pulled through the soil causing soil to be pushed up inside the tube 529 for collection. As more soil is pushed into the lower head of tube 529, earlier samples are pushed up further in the tube 529 and eventually push out of the upper end of the tube 529, where they can be moved into the soil analysis portion of the system through a collection system (not shown).

Figure 5E:
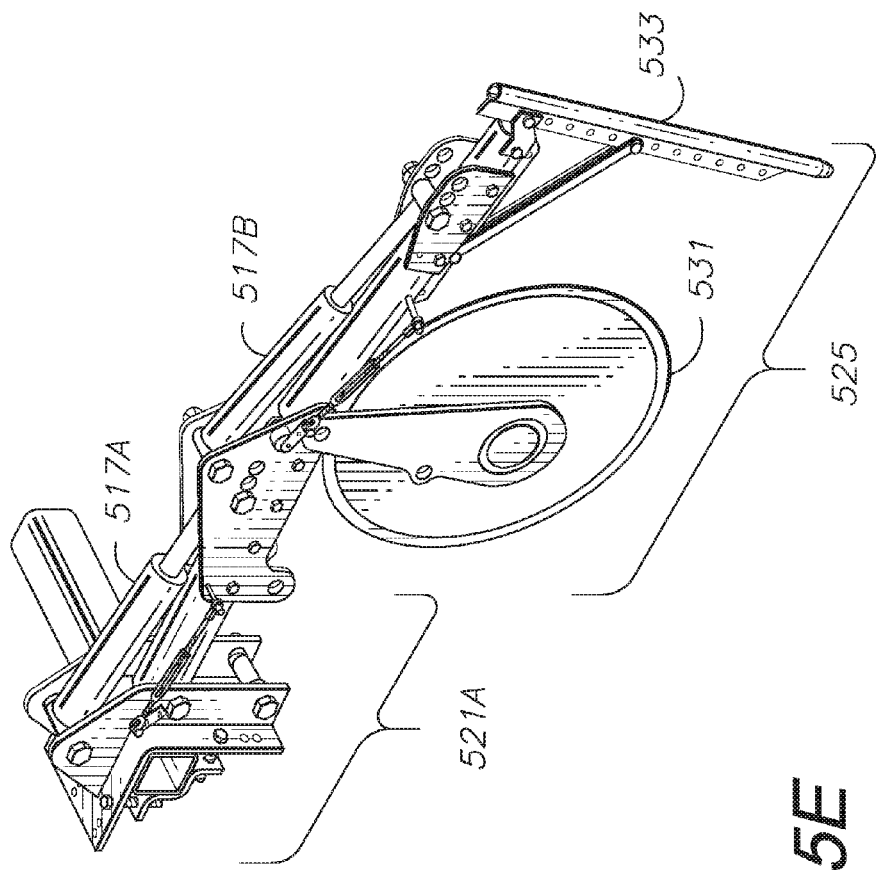
FIG. 5E is an illustration of an alternate embodiment of a vehicle-mounted device used for taking soil samples in real-time relying on a probing mechanism.
Figure 5F:
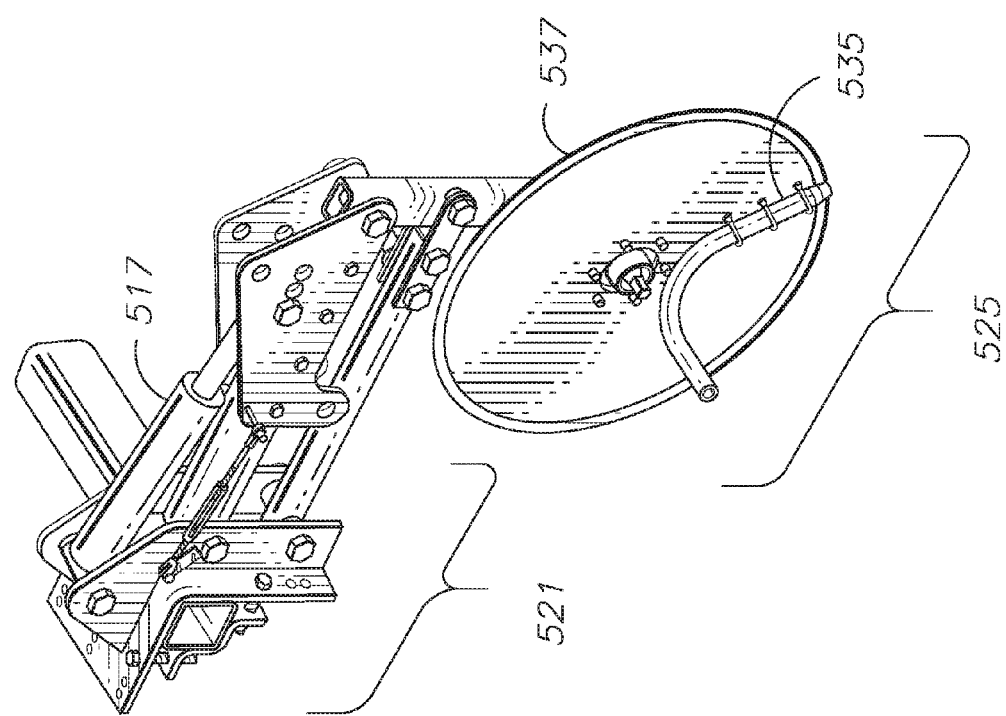
FIG. 5F is an illustration of an alternate embodiment of a vehicle-mounted device used for taking soil samples in real-time relying on a rotary probing mechanism.

FIG. 5E is an illustration of an alternate embodiment of a vehicle-mounted device used for taking soil samples in real-time relying on a probing mechanism. This embodiment of the soil sampling device is mounted on an adjustable arm 521A which uses a hydraulic cylinder 517A to move the arm 521A up and down. On the end of arm 521A, a ground engaging head 525 is mounted. In this embodiment of the ground engaging head 525 a disk 531 is used to cut into the soil and a probe mechanism 533 is mounted such that it can be lowered and pushed into the soil to acquire a sample. A second hydraulic cylinder 517B is used on the ground engaging head 525 to raise and lower the probe 533 to take the sample FIG. 5F is an illustration of an alternate embodiment of a vehicle-mounted device used for taking soil samples in real-time relying on a rotary probing mechanism. The device is mounted on an adjustable arm 521 and uses a hydraulic cylinder 517 to lower and raise the arm 521. On the end of the arm 521, a soil engaging head 525 is mounted. The soil engaging head 525 comprises a cutting disk 537, and mounted to the cutting disk 537 are one or more ground probes 535. The probes 535 are mounted on the disk 537 such that they push down into the soil as the disk 537 is pulled through the soil.

FIG. 6 shows a top view of one embodiment of a condition-based planting machine as described herein. It should be noted that several variations to the machine shown in FIG. 6 may be made without departing from the intent of the present invention, and that this embodiment is shown as one potential implementation.

The front end of the condition-based planting machine of FIG. 6 is shown on the far left. A soil sampling carriage or "toolbar" 611 holds one or more soil sampling units 610. As the condition-based planting machine moves forward, the soil sampling units 610 engage the soil of the field and collect samples. In one embodiment of the machine, the one or more soil sampling units 610 are capable of moving back and forth along the width of the soil sampling carriage 611, so that any point to be traveled over by the soil sampling carriage 611 can be sampled. That is, if only one soil sampling unit 610 existed on the soil sampling carriage 611, that unit 610 could be lifted from the ground and moved sideways to another point along the carriage 611 and then lowered back into the soil at a new location. Similarly, multiple soil sampling units 610 could move along the soil sampling carriage 611 to cover the ground between sampling units 610. Alternately, an adequate number of soil sampling units 610 can be fixed permanently on the soil sampling carriage 611 to ensure coverage to a sufficient resolution for sampling purposes, and the soil sampling units 610 would not need to move back and forth.

A seed tank containing particulate matter 614 (typically seed for a planter, but the concept can be applied to other substance such as fertilizer, such that precise placement of other types of matter can be achieved with the same machine) feeds into one or more X-Y position seeding units 618. Each X-Y seeding unit 618 has an appendage or other seeding tool which is mounted on an X-Y translation platform. The translation platform can move the seeding tool such that it is directly over any specified position in the field that is currently directly beneath the translation platform. Therefore, when the condition-based planting machine determines the soil conditions in front of the seeding units 618, the map of conditions at each location is given to an electronic control unit (not shown). The electronic control unit uses the information to determine where individual seeds/plants should be placed, and commands the one or more X-Y position seeding units 618 to move their seeding tool to the appropriate location in the soil and the seeding tool would engage the soil at that point and place the seed in the ground at the proper location.

A single, larger X-Y position seeding unit 618 could be used in place of the smaller seeding units 618 shown in FIG. 6. The inventive concept remains the same whether one larger unit is used or several smaller ones. The seeding tool is moved such that it is over the proper location for planting as determined by the soil conditions information, and the seed is placed into the soil. Components 612A and 612B show the front vehicle tires and the rear vehicle tires, respectively.

FIG. 7 shows a close up view of a single X-Y position seeding unit 618, showing that multiple positions can be commanded. Any of the small dots shown within the rectangle of the seeding unit 618 represents a potential position of the seeding tool, and the spacing of these dots depends on the resolution of the X-Y translation platform implementation. Three potential positions for the seeding tool, Position A, Position B, and Position C, are shown for illustrative purposes.

The implementation of a X-Y translation platform is known in the industry (such as the X-Y translation platforms done for pick-and-place machines in electronics manufacturing, and the implementation of such a platform for use in the present invention would be obvious to one skilled in the art.

FIG. 8 provides another view for how several X-Y position seeding units 618 can work in concert to cover a larger area of ground. Each unit shown has a larger circle on it, representing a hypothetical location of a seeding tool beneath each unit. If one imagines a line connecting each of the "current placement positions" on each of the X-Y seeding units shown from left to right, the line thus produced would show the spacing of seeds beneath the planting machine, similar to the optimal triangular spacing shown in FIG. 2. It should be noted that the timing of seeding tool engagement of each of the respective X-Y seeding units 618 is asynchronous, and actual seeding by each tool is timed such that it places the seed properly in the direction of travel of the machine. That is, if the seed is placed by the left-most seeding unit 618 shown in FIG. 8 at time 0, and the seed placed by the seeding unit 618 next to it is placed by that unit at time 1, then the two seeds will be placed farther apart than they would be if both seeding units 618 planted at the same exact time. Several example planting positions are shown in FIG. 8 for illustrative purposes. The location labeled POS1 shows an example placement of the planting tool (and therefore the seed) for the first seeding unit 618 on the planter. POS2 and POS3 show hypothetical seeding placements for seeding unit 2 and seeding unit 6, respectively.

Figure 9:
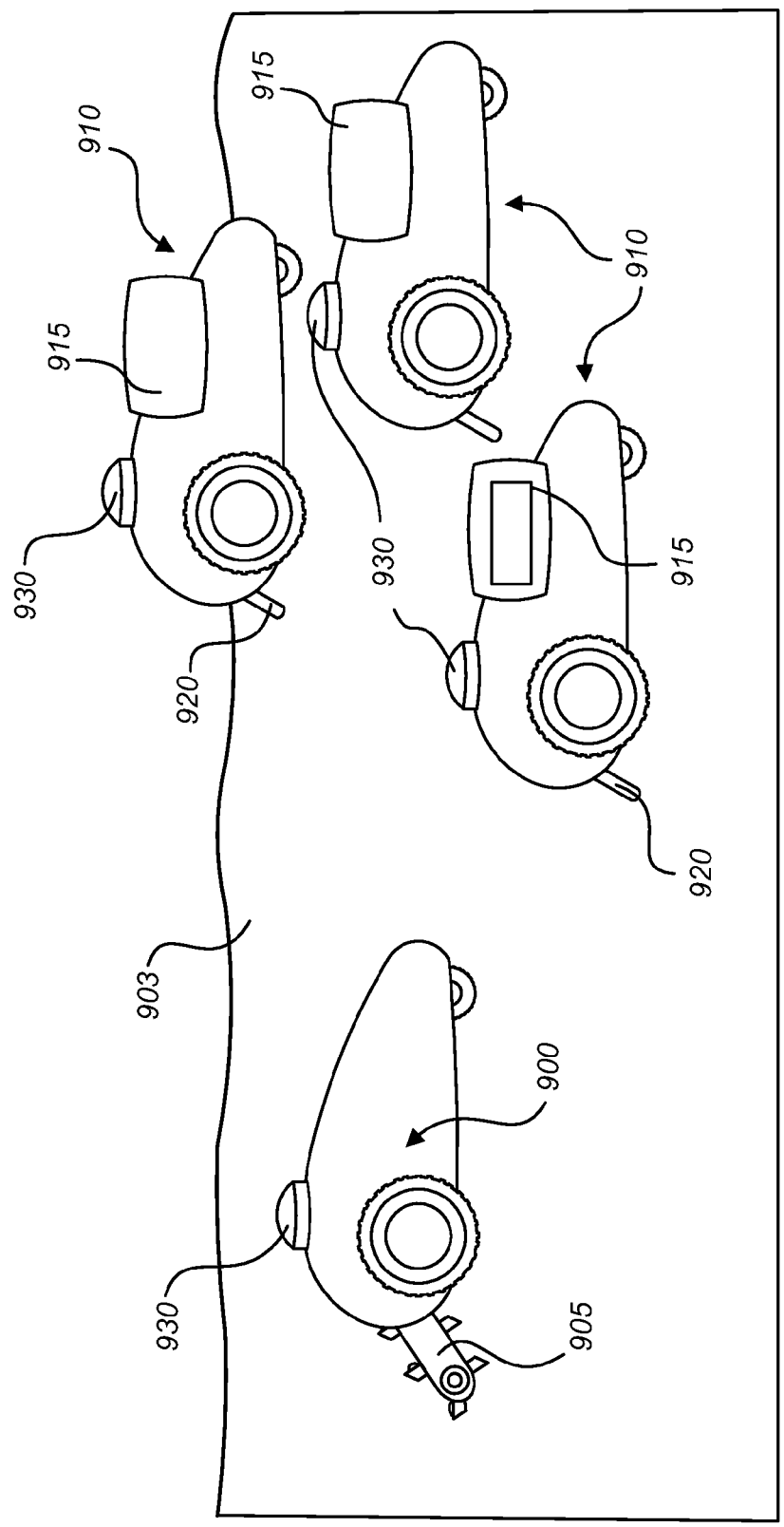
FIG. 9 is an alternate embodiment of the condition-based planting system of the present invention, in which one or more autonomous vehicles work in conjunction to plant seeds based on soil conditions.

FIG. 9 shows a potential alternate embodiment of the condition-based planting system, in which separate, autonomous vehicles are used to perform the high-level functions shown in FIG. 4. One or more autonomous sampling units 900 proceed through a field taking samples with a soil sampling device 905 and creating a soil conditions map as previously described based on location information received by a global navigation satellite system (GNSS) receiver 930. The soil conditions map thus created is transferred wirelessly (or by any appropriate means of data transfer) to one or more autonomous planting units 910, which also have GNSS receivers 930 and which use the soil conditions map data to determine how they are to plant. The autonomous planting units 910 contain seed and/or chemicals in one or more storage tanks 915, and can use planting tools 920 to put seed into the ground 903. The units in this embodiment are autonomous and can move through the field without an operator. When more than one autonomous unit (either sampling or planting, 900 or 910) are present, the autonomous vehicles will communicate with each other and coordinate the sampling and/or planting process such that no overlap occurs in the field.

In should be noted that one advantage of a condition-based planting machine as described herein is that it is possible to record the specific location (latitude and longitude) of every seed/plant that is planted in a field, since each seed/plant (or group of seeds/plants) is placed at a specific location by the planting machine. Since the vehicle or system knows its location through the use of a GNSS sensor 930, this precise location data can be stored for each placement, and a seed/plant location map can be generated and used by other vehicles or subsequent passes of the same vehicle. By knowing the exact location of each seed or plant, a chemical spraying system, for example, can deliver fertilizer or other chemicals to only the points needed based on the seed/plant location map.

Smart Row Unit Embodiment

The remaining figures (FIGS. 10 through 15) illustrate an alternate embodiment of the condition-based planting machine of the present invention. While the previous examples and figures in this specification focused on an embodiment of the condition-based planting machine based on a "pick-and-plant" concept, the embodiment described below is centered on the use of a "smart row unit." Planting machines that exist in the prior art today are typically designed around the concept of a "row unit."

Figure 10:
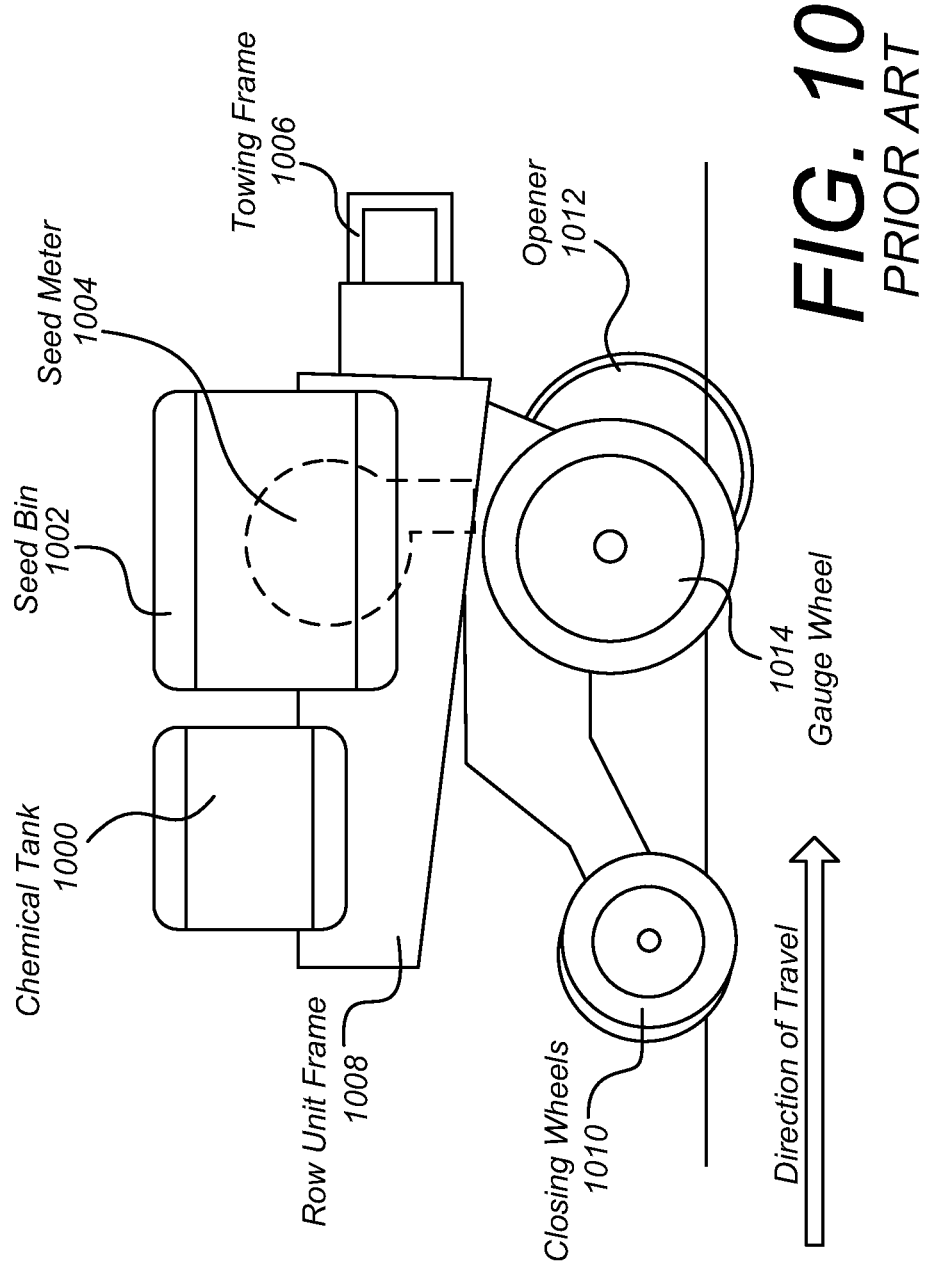
FIG. 10 is an illustration of a typical seeding unit used in agricultural planting as seen in the prior art.

FIG. 10 is an illustration of a typical seeding/planting row unit of the prior art. The device shown here is called a "row unit" as it is designed to drop a single line of seeds into a furrow that is opened as the front of the row unit is pulled through the soil. Several row units are attached to a draw bar and pulled behind a tractor in order to sow several rows of seeds at once.

Turning to FIG. 10, the prior art row unit has an "opener" 1012 near the front that consists of a disk or similar device for cutting a furrow into the soil. The row unit is connected by means of a "towing frame" 1006 to the draw bar of a planting implement so that the row unit can be pulled through the field. Each row unit has a "seed bin" 1002 containing the seeds that are to be planted. These seeds are fed into a seed meter 104 which is built into seed bin 1002, and the seed meter 1004 is responsible for dropping the seeds down into the furrow created by the opener 1012 at a controlled rate.

Optionally, the row unit of the prior art has one or more chemical tanks 1000 that are used to hold chemicals, such as fertilizer, pesticide, etc., that may be sprayed into the furrow as the seed is dropped. The seed bin 1002 and the chemical tank 1000 are supported by a row unit frame 108 that provides the structural support required to hold the components of the row unit. In the back of the row unit, there are typically closing wheels 1010 which pass over the furrow, pushing the displaced dirt from the furrow back into the furrow and packing it to "close" the furrow over the planted seed. A gauge wheel 1014 is sometimes used on these row units to provide information on the height and or density of the soil immediately beneath the row unit.

Figure 11:
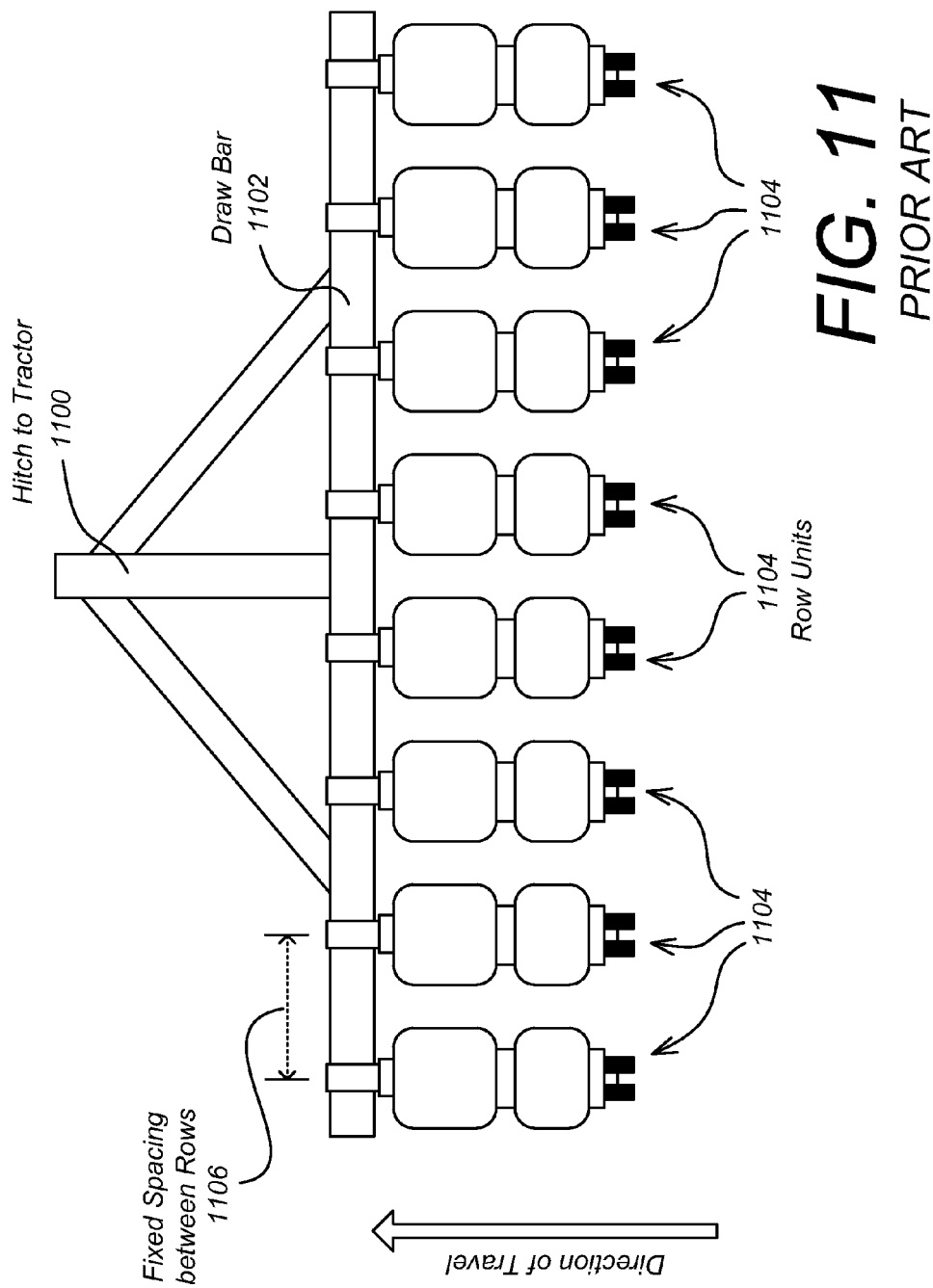
FIG. 11 is an illustration of a series of seeding units mounted on the draw bar of an implement as seen in the prior art.

FIG. 11 is an illustration of an implement with multiple row units 1104 from the prior art. FIG. 11 shows several row units 1104 attached to a single draw bar 1102 to form a tow-behind agricultural implement, such as a planter. The draw bar 1102 is itself attached to a tractor hitch 1100 so that it can be pulled behind a tractor so it can be moved through a field. A key characteristic of this configuration, and one of its key limitations, is that the spacing of the row units 1106 is fixed. The row units 1104 themselves do not have sensing capabilities to detect the conditions of the soil into which they are planting, and so there is no information upon which the implement or row units 1104 can draw to change the spacing of the rows 1106, so the default is to create straight rows. Placing the rows as close together as possible to maximize a crop's yield has some effect, of course, but knowing the ultimate moisture and nutrient content of the soil before the seeds are placed into it might allow significant additional improvements in yield if the spacing of the seeds can be controlled.

Figure 12:
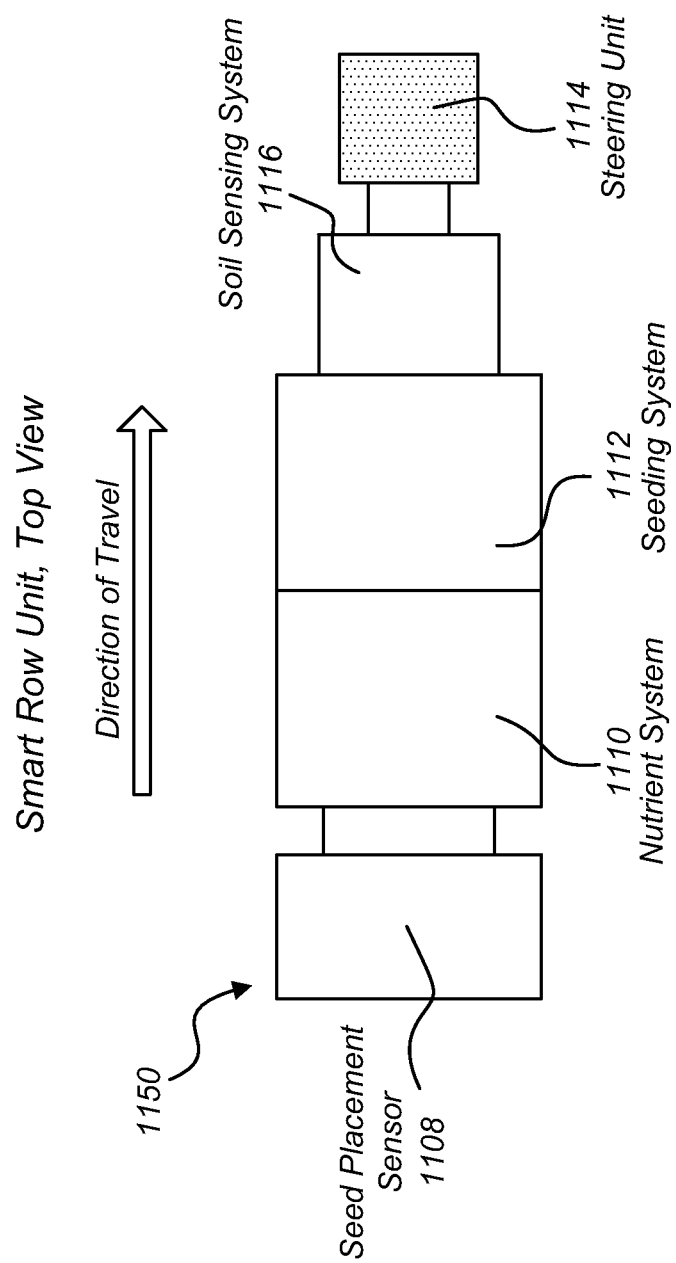
FIG. 12 is a top view of a smart row unit as described in the present invention.

FIG. 12 is a top view depiction of one embodiment of a smart row unit 1150 of the present invention. The concept behind the "smart row unit" 1150 is that innovative new sensors are integrated into a row unit to sense soil conditions and seed placement and that the spacing between units 1150 and the seed drop rate can be dynamically changed to take advantage of this new knowledge.

Turning to FIG. 12, this top view of one embodiment of the smart row unit 1150 of the present invention shows a soil sensing system 1116 near the front of the smart row unit 1150. This soil sensing system 1116 is capable of analyzing the soil to determine moisture content and nutrient content. In one embodiment, this might be done using a spectrographic analysis of the overturned soil to determine its contents. In another embodiment, a sample of soil may be pulled up into the sensing system for additional preparation and analysis steps, as described previously in this specification. It should be noted that all of the soil sampling devices discussed previously in this specification can be adapted for use on a smart row unit 1150.

The smart row unit 1150 also has a seeding system 1112 which comprises a bin containing the seed to be planted, a metering system for controlling the rate at which seed is dropped into the ground as well as the position at which it is dropped, and a processor for interpreting soil data from the soil sensing system 1116 and for controlling the seed placement.

The seeding system 1112 is tied into a nutrient system 1110 which contains chemicals that can be used to supplement the nutrients missing from the soil as detected by the soil sensing system 1116. If the soil is found to be lacking enough nitrogen, for example, based on the current soil conditions, the type of crop, the season, etc., then additional nitrogen can be added to the soil or mixed with the seeds before they go into the ground.

The smart row unit 1150 has a seed placement sensor 1108 which is used to detect the exact depth and side-to-side placement of the seed once it has been planted. This allows the seed location to be marked and added to a "planted crop map" which shows where the seeds are and how deep they are, so that future application of fertilizer and other chemicals can be placed exactly on the spot where the seed or plant is, and the waste caused by blanketing an entire area with chemicals is avoided.

The steering unit 1114 on the front side of the smart row unit 1150 is a module which takes commands from the smart row unit 1150 and which responds as appropriate by moving the smart row unit 1150 side-to-side on the draw bar to with it attached, controlling the side-to-side placement of seeds. The steering unit 1114 may comprise an electric or hydraulic motor which can pull the smart row unit 1150 back and forth along the draw bar.

Figure 13:
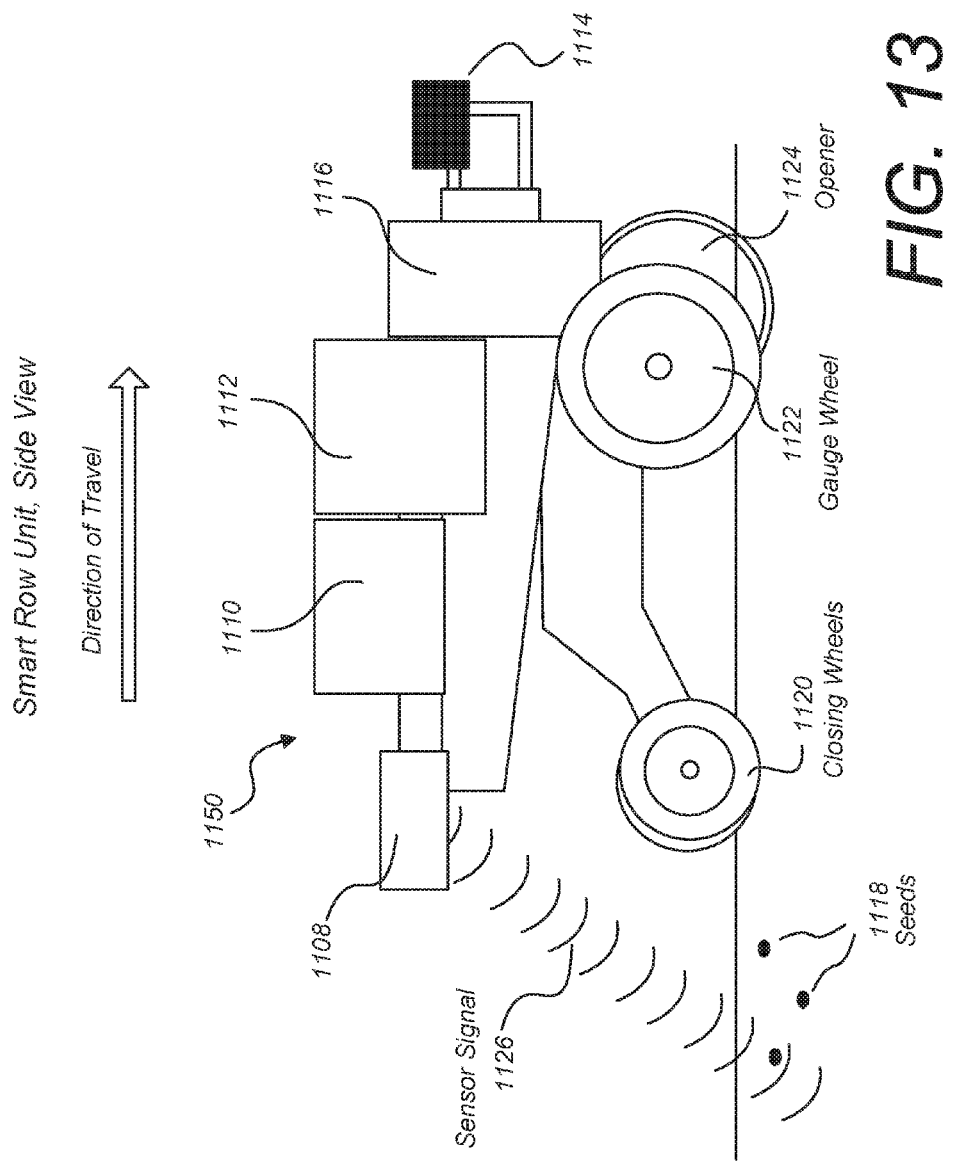
FIG. 13 is a side view of a smart row unit as described in the present invention.

FIG. 13 is a side view depiction of one embodiment of a smart row unit 1150 of the present invention. This can be compared and contrasted to the prior art row unit of FIG. 10. The smart row unit may use some of the same conventional components as seen on the prior art row unit. For example, the closing wheels 1120, gauge wheel 1122, and the opener 1124 may be essentially the same as those used for the traditional row unit, providing a similar footprint.

However, the upper half of the smart row unit 1150 show significant differences. The illustration shown here is meant to show once possible embodiment of the smart unit 1150 and variations on the concept shown here are possible without varying from the inventive concept. Turning back to FIG. 13, the soil sensing system 1116 is shown as being close to the front of the smart row unit 1150, as the soil needs to be sampled and analyzed before any action can be taken. This illustration assumes that the soil sensing system 1116 is an integral part of the smart row unit 1150, but it may actually be a separate subsystem or tool, and may even be mounted on a separate vehicle which has made a previous pass over the same area, collecting data.

The soil sensing system 1116 must take a sample of overturned soil and analyze it for both moisture and nutritional content. It will also look at such things as soil type, soil fertility, and the time of year that the planting is being performed. This might be accomplished by illuminating the overturned soil with various wavelengths of light and analyzing which wavelengths are absorbed and which are reflected, using a spectrographic type of analysis, as previously described in this specification. Other methods of soil analysis known to those skilled in the art may be used to achieve this function.

The seeding system 1112 will typically be mounted such that is drops seeds directly into the furrow as it is opened by the opener 1124. The seed meter that is currently used in the prior art, or at least one that is electrically driven and can be driven at various speeds, may be used to drop seeds. The seeding system 1112 would determine (based on information from the soil sensing system 1116 and, optionally, other sensors and data sources, the rate at which seeds should be dropped and would drive the seed meter to drop a seed at the appropriate moment. However, it would also be possible to have an entirely new type of seed delivery mechanism that has better control over both the location and depth of the seed, such as the X-Y translation platforms shown in FIGS. 6-8. The seeding system 1112 may also have a processor or control module for interpreting the data from all inputs and sensing systems and for generating system control directives. This control module, not shown here as it is integral to the seeding system 1112 in this embodiment, could be a separate module.

The seeding system 1112 (or a separate control module) would communicate with other system modules and generate commands to send to the nutrient system 1110 as to what types of chemicals/nutrients are needed, to the steering unit 1114 to move the smart row unit from side to side as needed for seed placement, and to the seed placement sensor 1108 to acquire information about final seed placement or to command changes in sensor settings.

The nutrient system 1110 contains several separate types of chemicals, which may include fertilizers and pesticides, individual soil nutrients, and water, all of which can be added to the furrow or to the seed itself as required based on the soil conditions. The nutrient may be separated by type and mixed together in the nutrient system 1110 as required to create the proper supplement to add to the soil.

The seed placement sensor 1108 is a sensing device which can determine the three-dimensional location of the planted seed with high accuracy. Ideally, this is done after the furrow has been closed and the dirt packed back on top of it. In order to do this, a technology such as a ground-penetrating radar may be used to find the seed precisely as it exists beneath the soil, emitting a sensor signal 1126 to detect the seed in situ. If a ground-penetrating radar is used, the sensor itself may actually be much closer to the ground than it is shown in FIG. 13. It might even be in contact with the ground. For instance, a polyethelene (or similar material) pad may be beneath the radar sensor and drag on the ground itself.

Other types of technology are possible for this sensor. For example, before the dirt is put back on the seed, the seed can be located with an optical system (visual identification of the location without the dirt covering it).

The steering unit 1114 is a device that may ride on the draw bar of the implement (as shown in FIG. 14, to be discussed) and is used to move the smart row unit 1150 from side to side, as commanded by the seeding system 1112. It may be a motorized component such as a gear or wheel that sits in a track on the draw bar 1126 and can be commanded to move back and forth on the track to pull the smart row unit 1150 one way or another.

Other means of moving the row unit from side to side may be used without deviating from the functional intent of this invention.

FIG. 14 is an illustration of one embodiment of an implement with multiple smart row units 1150 as described in the present invention. Several of the smart row units 1150 shown in FIG. 13 can be added to a draw bar 1126 as shown in FIG. 14 to make a multi-row implement. The steering units 1114 on the smart row units 1150 may pull the smart row units 1150 back and forth on a track in the draw bar or on the draw bar 1126 itself. The implement in FIG. 14 can be compared and contrasted to the prior art implement of FIG. 11, and one of the key differences other than the row units themselves is the ability to have variable spacing between rows with the smart row units, as indicated by 1130A and 1130B, commanded as needed to move the seed to the areas with the best nutrient conditions.

FIG. 15 is a depiction of a potential use for the smart row units 1150 of the present invention. As the implement is towed (by a tractor, not shown) toward the right hand side of the page, the smart row units 1150 (shown here as dotted lines but visible in FIG. 14) are moved along the draw bar 1126 (see FIG. 14) each controlled individually, to create curving travel paths as needed to move seed to the locations with the best soil conditions for growth. The dashed lines shown are the travel paths 1132 of each individual smart row unit 1150 in this fictional example. The black dots or circles 1134 are meant to indicate locations where one or more seeds was dropped. By controlling the side-to-side location of the smart row units 1150 in relation to the draw bar 1126, and by controlling the precise moment of seed drop, the planter can locate the seeds as needed to match the best soil conditions.

Two areas are circled in FIG. 15 for comparison purposes. Area A shows a tight pattern of travel paths coupled with a large number of consecutive seed drops to create a highly populated area in the field. This is likely due to the fact that Area A was seen as having the best nutrient conditions for planting.

Area B shows an area of low density or low seed population, likely due to the fact that the nutrient content for that area (or other conditions) were see as less conducive to growing that other areas in the field.

Harvesting a Crop Planted with Optimal, Non-Uniform Row Spacing

Because the inventions described herein deviate from the normal practice of ensuring straight rows of plants that can be readily harvested with standard equipment, there may be a need to develop a new type of header to deal with crops that are not in a rows. For example, a typical corn combine header is constructed of a series of "snouts" or pointed projections arranged like the teeth on a comb that move through the rows of the corn crop and guide the stalks being harvested into a gathering mechanism on either side of each snout.

It would be possible to create a combine header with narrower snouts that can move from side to side along the header in real-time (while harvesting) to move between stalks that are not planted in consistent row spacing. Such a harvesting head could accept data stored by a condition-based planting machine as described herein such that it knows the precise location of each placed seed or plant, and could move the snouts from side to side based on this data in order to grab each plant.

It may also be possible to design a header that has smaller snouts and a novel mechanism for pulling the stalks or plants into the header that allows the smaller snouts to be placed close enough together to compensate for the non-uniform spacing created by the present invention. U.S. Pat. No. 7,484,348 by Bich describes a header invention that would allow much smaller row spacing, and this invention may work for harvesting a non-uniformly spaced crop as described herein.

Having described the preferred embodiments, it will become apparent that various modifications can be made without departing from the scope of the invention as defined in the accompanying claims. In particular, the processes shown in the figures and described in the specification may be performed by multiple vehicles and at different times, either with a driver or by autonomous vehicle, with each vehicle performing a subset of the functionality required. Also, any appropriate soil-engaging device can be used to take a soil sample at the desired depth, and the trenching devices shown herein are not meant to be limiting in anyway. Other appropriate ground-engaging devices include, but are not limited to, drills, augers, plows, and disks. Any appropriate type of analysis may be used to determine the type, nutrient content, and moisture of the soil.

Two main examples of a condition-based planting machine are given herein, a "pick-and-plant" machine that uses one or more X-Y translation platforms to position seeds in the travel path of a planting vehicle, and a machine using smart row units which can move side-to-side along the travel path of a planting vehicle to place seeds appropriately. There may be additional methods of placing seeds in optimal soil conditions other than those shown here which are functionally equivalent to the present invention.

The examples and processes defined herein are meant to be illustrative and describe only particular embodiments of the invention.

What is claimed:

1. An adaptive condition-based agricultural planting system configured for real-time soil sensing in situ and interactive seed placement based on soil sensing, which planting system comprises:
    a planter configured for traversing a crop field and including a toolbar and multiple planter row units transversely movably mounted on said toolbar;
    a processor connected to said system and programmed for receiving as real-time input crop growth factors, said crop growth factors chosen from the group comprising moisture levels, nutrient content and chemical composition;
    a soil sensing and analysis subsystem mounted on said equipment and connected to said processor, said sensing and analysis subsystem configured for: extracting physical soil samples from said field; receiving said soil samples; analyzing said retrieved soil samples; and sensing crop growth factors including moisture level, nutrient content and chemical composition from said extracted soil samples concurrently with equipment travel over field locations being sensed;
    said multiple planter row units dynamically movably mounted on said toolbar and each including a furrow opener and a seed discharge configured for placing seeds subsurface in a furrow opened by said opener;
    a seed source mounted on said equipment and configured for supplying seed to said seed discharges;
    a planter row unit positioning mechanism connected to said processor and configured for individually positioning said planter row units;
    said processor programmed for dynamically positioning said planter row units and depositing seeds therefrom subsurface at locations determined by said processor based on optimal crop growing conditions at said seed-planting locations;
    said processor further programmed to control additions of chemicals to said soil to add nutrients configured to optimize crop growing conditions upon detection of a lack of said nutrients by said processor;
    the planting system is configured for planting seeds in positions directly beneath the planting system;
    the data gathered from the analyzed soil samples is used to determine the optimal placement of seeds or plants in a field in order to take advantage of the soil conditions present and to optimize crop yield;
    the planting system further comprises multiple pick-and-plant planters each movably mounted on said toolbar, each pick-and-plant planter comprising a translation platform and a planting tool located on the underside of the translation platform capable of interacting with the ground; and
    each planting tool configured for depositing one or more seeds at optimal locations as determined by the processor.

2. A condition-based planting system according to claim 1, which includes a smart row planter movably mounted on said toolbar and configured for moving transversely from side-to-side perpendicular to the path of the planning system and of placing one or more seeds into the ground at planting locations determined by the processor.

3. The agricultural planting system according to claim 1, which includes:
    said soil sensing system field interface being configured for taking soil samples from multiple points in a field along the travel path of the planter;
    said processor being configured for determining if the soil removed from the furrows has adequate nutrient content; and
    each said planter row unit including a nutrient injection subsystem connected to said processor and configured for adding nutrient content to the soil along a respective furrow if the soil sample removed therefrom does not have adequate nutrient content.

* * * * *